United States Patent
Al Assad et al.

(10) Patent No.: US 11,685,431 B2
(45) Date of Patent: Jun. 27, 2023

(54) STEERING ANGLE CALIBRATION

(71) Applicant: Motional AD LLC, Boston, MA (US)

(72) Inventors: Omar Al Assad, Milton, MA (US); Francesco Seccamonte, Singapore (SG)

(73) Assignee: Motional AD LLC, Boston, MA (US)

(*) Notice: Subject to any disclaimer, the term of this patent is extended or adjusted under 35 U.S.C. 154(b) by 75 days.

(21) Appl. No.: 16/728,982

(22) Filed: Dec. 27, 2019

(65) Prior Publication Data

US 2020/0207412 A1 Jul. 2, 2020

Related U.S. Application Data

(60) Provisional application No. 62/786,968, filed on Dec. 31, 2018.

(51) Int. Cl.
*B62D 6/00* (2006.01)
*B60W 40/114* (2012.01)
(Continued)

(52) U.S. Cl.
CPC ............ *B62D 6/003* (2013.01); *B60W 40/114* (2013.01); *C09D 7/61* (2018.01); *C09D 7/63* (2018.01); *C09D 109/06* (2013.01); *C09D 125/06* (2013.01); *E01C 7/351* (2013.01); *E01C 7/356* (2013.01); *E01C 7/358* (2013.01)

(58) Field of Classification Search
None
See application file for complete search history.

(56) References Cited

U.S. PATENT DOCUMENTS 5,673,367 A * 9/1997 Buckley ............... B25J 9/1612
706/23
6,185,485 B1 * 2/2001 Ashrafi ............... B60T 8/1755
180/197
(Continued)

FOREIGN PATENT DOCUMENTS

CN 104918836 * 9/2015
CN 105216798 1/2016
(Continued)

OTHER PUBLICATIONS

Wang et. al., Privacy-Preserving Cloud-Based Road Condition Monitoring With Source Authentication in VANETs, Jul. 2019, IEEE Transactions on Information Forensics and Security, vol. 14, No. 7, Jul. 2019 (Year: 2019).*

(Continued)

*Primary Examiner* — Christian Chace
*Assistant Examiner* — Scott R Jagolinzer
(74) *Attorney, Agent, or Firm* — Fish & Richardson P.C.

(57) ABSTRACT

Among other things, techniques are described for steering angle calibration. An autonomous vehicle receives a steering angle measurement and a yaw rate measurement, and estimates a steering angle offset using the steering angle measurement, the yaw rate measurement, and a wheel base of the autonomous vehicle. An estimated yaw rate is determined based on a yaw rate model, the steering angle measurement and the estimated steering angle offset. The yaw rate measurement and the estimated yaw rate are compared and an action is initiated on the autonomous vehicle in response to the comparing.

27 Claims, 15 Drawing Sheets

(51) Int. Cl.
*C09D 7/61* (2018.01)
*C09D 7/63* (2018.01)
*C09D 109/06* (2006.01)
*C09D 125/06* (2006.01)
*E01C 7/35* (2006.01)

(56) References Cited

U.S. PATENT DOCUMENTS

| | | | |
|---|---|---|---|
| 8,364,348 B2 | 1/2013 | Zell et al. | |
| 11,318,950 B2* | 5/2022 | Kato | B60W 40/114 |
| 2003/0212476 A1* | 11/2003 | Aanen | B62D 15/02 |
| | | | 702/92 |
| 2004/0024565 A1* | 2/2004 | Yu | G05B 17/02 |
| | | | 702/151 |
| 2005/0234622 A1* | 10/2005 | Pillar | B60W 50/029 |
| | | | 701/41 |
| 2010/0235052 A1* | 9/2010 | Shartle | B62D 15/0245 |
| | | | 701/41 |
| 2012/0041658 A1* | 2/2012 | Turner | B60W 10/20 |
| | | | 701/68 |
| 2012/0089297 A1* | 4/2012 | Shimizu | B60W 40/072 |
| | | | 701/29.7 |
| 2013/0054074 A1* | 2/2013 | Schreiber | B62D 15/0245 |
| | | | 701/23 |
| 2014/0200770 A1 | 7/2014 | Bahena et al. | |
| 2014/0288779 A1* | 9/2014 | Di Cairano | B62D 15/0235 |
| | | | 701/42 |
| 2014/0288785 A1* | 9/2014 | Bretzigheimer | B60T 8/17558 |
| | | | 701/48 |
| 2015/0039183 A1* | 2/2015 | Yang | B60W 30/10 |
| | | | 701/38 |
| 2018/0081361 A1 | 3/2018 | Robinson et al. | |
| 2019/0086929 A1* | 3/2019 | Tamboli | G05D 1/0214 |
| 2020/0039523 A1* | 2/2020 | Ghasemalizadeh | B62D 6/00 |

FOREIGN PATENT DOCUMENTS

| | | | |
|---|---|---|---|
| CN | 106143211 | * 11/2016 | |
| DE | 102008026233 A1 | * 12/2009 | B62D 15/0245 |
| DE | 102012202545 A1 | * 8/2013 | B60W 40/10 |
| DE | 102014200100 | 7/2014 | |
| EP | 3254547 | 12/2017 | |
| JP | H0194030 | 4/1989 | |
| JP | H02240705 | 9/1990 | |
| WO | WO 2018/230176 | 12/2018 | |

OTHER PUBLICATIONS

Park et al, Effects of camber angle control of front suspension on vehicle dynamic behaviors, 2012, Journal of Mechanical Science and Technology, pp. 307-313 (Year: 2012).*
[No Author Listed], "J3016: Taxonomy and Definitions for Terms Related to On-Road Motor Vehicle Automated Driving Systems" SAE International, Sep. 2016, 30 pages.
Larsen, "Real-Time Calibration of the Steering Wheel Angel Sensor," Thesis for the degree of Master of Science in Electrical Engineering, Linkoping University, 2017, 52 pages.
PCT International Search Report and Written Opinion in International Appln. PCT/IB2019/061414, dated Apr. 20, 2020, 12 pages.

* cited by examiner

STEERING ANGLE CALIBRATION

CROSS-REFERENCE TO RELATED APPLICATION

This application claims priority to U.S. Provisional Patent Application No. 62/786,968, filed Dec. 31, 2018, the entire contents of which are incorporated herein by reference.

TECHNICAL FIELD

This description relates to steering angle calibration for vehicles, such as autonomous vehicles.

BACKGROUND

For safe operation of an autonomous vehicle, the steering angle of the autonomous vehicle has to be periodically aligned. Steering angle alignment is crucial for controlling an autonomous vehicle because the control system of the autonomous vehicle relies on an accurate steering angle to generate control commands. Mechanical steering angle alignment is typically performed by a technician or mechanic in an auto repair shop.

SUMMARY

In general, in an aspect, an autonomous vehicle receives a steering angle measurement and a yaw rate measurement, and estimates a steering angle offset using the steering angle measurement, the yaw rate measurement, and a wheel base of the autonomous vehicle. An estimated yaw rate is determined based on a yaw rate model, the steering angle measurement and the estimated steering angle offset. The yaw rate measurement and the estimated yaw rate are compared and an action is initiated on the autonomous vehicle based on the comparison.

In an embodiment, a method includes: receiving, from a processing circuit of an autonomous vehicle, a steering angle measurement; receiving, from the processing circuit, a yaw rate measurement; estimating, using the processing circuit, a steering angle offset based on the steering angle measurement, the yaw rate measurement, and the wheel base of the autonomous vehicle; determining, using the processing circuit, an estimated yaw rate based on a yaw rate model, the steering angle measurement, and the estimated steering angle offset; and operating, using a control circuit, the autonomous vehicle based on the steering angle offset.

The method further includes comparing, using the processing circuit, the yaw rate measurement and the estimated yaw rate; and initiating, using the processing circuit, an action on the autonomous vehicle based on a result of the comparing.

In an embodiment, the action includes calibrating, by the processing circuit, the yaw rate measurement using the estimated yaw rate.

In an embodiment, receiving the steering angle measurement includes: receiving, using the processing circuit, a measured left-turn offset component of the steering angle when the autonomous vehicle is making a left turn; receiving, using the processing circuit, a measured right-turn component of the steering angle when the autonomous vehicle is making a right turn; and determining, using the processing circuit. In an embodiment, the measured steering angle is an average of the left-turn component and the right turn component. In an embodiment, the measured steering angle is weighted sum of the left-turn component and the right-turn component.

In an embodiment, the estimated steering angle offset is determined using a recursive least squares adaptive filter formulation that includes the steering angle measurement, yaw rate measurement, and wheel base of the autonomous vehicle.

In an embodiment, the estimated steering angle offset is determined using a Kalman filter formulation that includes the steering angle measurement, yaw rate measurement, and wheel base of the autonomous vehicle.

In an embodiment, the method further includes: comparing, using the processing circuit, a forward speed of the autonomous vehicle with a forward speed threshold; comparing, using the processing circuit, the yaw rate measurement with a yaw rate threshold; comparing, using the processing circuit, a lateral acceleration measurement or slip angle measurement of the autonomous vehicle with a lateral acceleration threshold or slip angle threshold, respectively; and excluding or augmenting, using the processing circuit, the steering angle measurement based on one or more results of the comparing.

In an embodiment, the method further includes: determining, using data from one or more sensors of the autonomous vehicle, whether a wheel of the autonomous vehicle is in static contact with a road surface; and in accordance with a determination that a wheel of the autonomous vehicle is not in static contact with the road surface, excluding or augmenting, using the processing circuit, the steering angle measurement.

In an embodiment, the method further includes estimating a plurality of steering angle offsets over a period of time or a driving distance, and filtering the plurality of steering angle offsets to remove outlier estimated steering angle offsets.

In an embodiment, initiating an action on the autonomous vehicle further includes presenting, using an output device of the autonomous vehicle or a passenger's personal device, a maintenance alert.

In an embodiment, initiating an action on the autonomous vehicle further includes sending, using a wireless transmitter of the autonomous vehicle, at least one of the steering angle measurements or yaw rate measurements to a network-based computing platform; receiving, using a wireless transmitter of the autonomous vehicle, a maintenance alert from the network-based computing platform; and presenting, using an output device of the autonomous vehicle, the maintenance alert.

In an embodiment, initiating an action on the autonomous vehicle further includes: sending, using a wireless transmitter of the autonomous vehicle, road surface condition information to a network-based computing platform, and receiving, using a wireless receiver of the autonomous vehicle, a steering angle calibration parameter from the network-based computing platform, the steering calibration parameter determined by the network-based computing platform based on the road surface condition; and augmenting, by the processing circuit, the steering angle measurement with the steering angle calibration parameter.

In an embodiment, the method further includes operating, using a control circuit, an autonomous vehicle according to a maximum speed limit, wherein the maximum speed limit is determined based on the steering angle offset. In an embodiment, the maximum speed limit is determined based on the steering angle offset and a set of weather conditions of the environment.

In an embodiment, a steering angle calibration system for an autonomous vehicle includes: a steering angle sensor, a yaw rate sensor, one or more processing circuits, one or more non-transitory storage media storing instructions which, when executed by the one or more processing circuits, cause performance of operations comprising: receiving a steering angle measurement from the steering angle sensor; receiving a yaw rate measurement from the yaw rate sensor; estimating a steering angle offset based on the steering angle measurement, the yaw rate measurement and a wheel base of the autonomous vehicle; determining an estimated yaw rate, the estimated yaw rate determined based on a yaw rate model, the steering angle measurement and the estimated steering angle offset; comparing the yaw rate measurement and the estimated yaw rate; and initiating an action on the autonomous vehicle based on a result of the comparing.

In an embodiment, the steering angle sensor is a steering column sensor or a steering wheel sensor.

These and other aspects, features, and implementations can be expressed as methods, apparatus, systems, components, program products, means or steps for performing a function, and in other ways.

These and other aspects, features, and implementations will become apparent from the following descriptions, including the claims.

DETAILED DESCRIPTION

Figure 1:
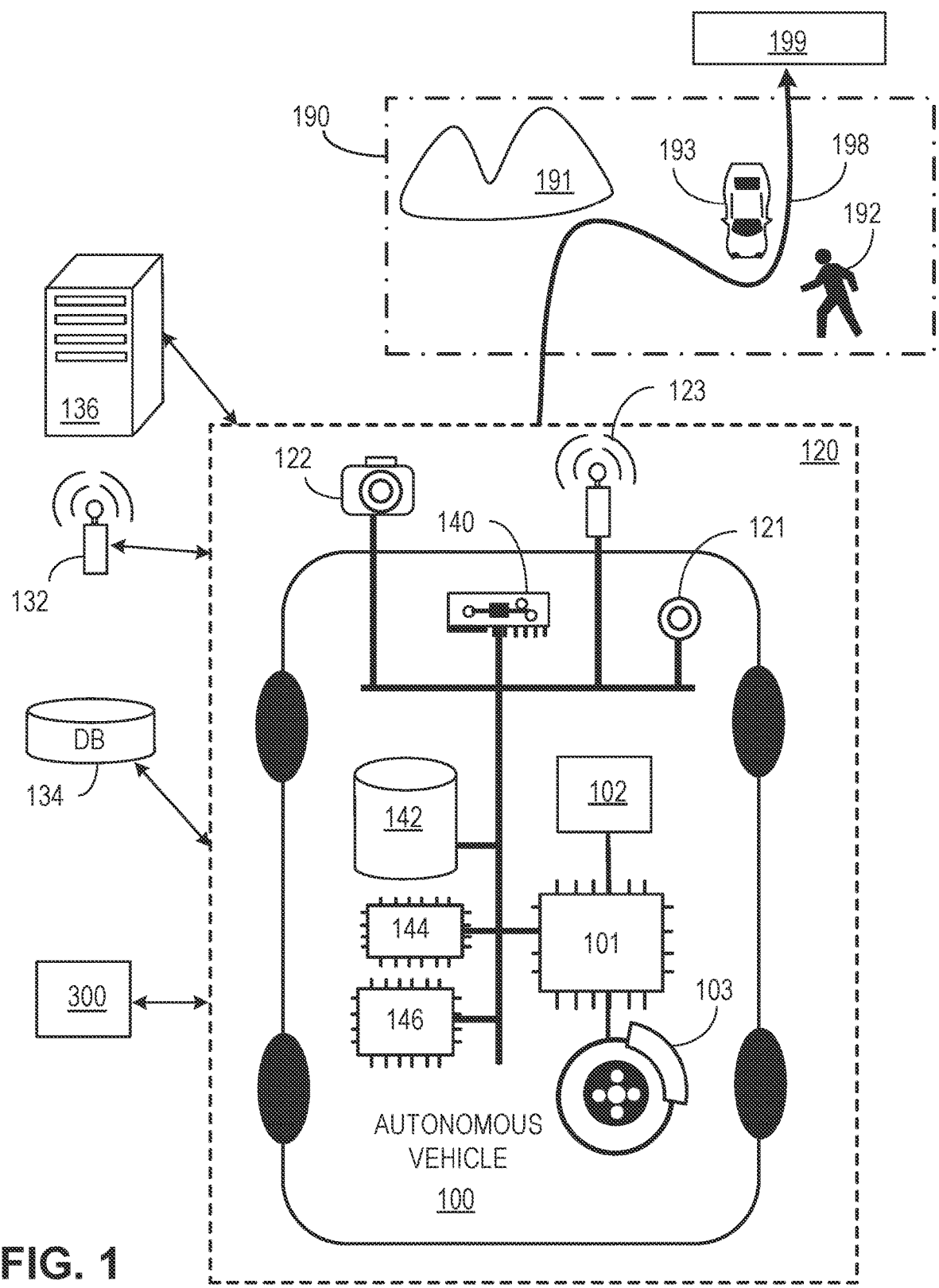
FIG. 1 shows an example of an autonomous vehicle having autonomous capability, in accordance with an embodiment.

In the following description, for the purposes of explanation, numerous specific details are set forth in order to provide a thorough understanding of various implementations. It will be apparent, however, that the implementations described herein may be practiced without these specific details. In other instances, well-known structures and devices are shown in block diagram form in order to avoid unnecessarily obscuring the implementations described herein.

In the drawings, specific arrangements or orderings of schematic elements, such as those representing devices, modules, instruction blocks and data elements, are shown for ease of description. However, it should be understood by those skilled in the art that the specific ordering or arrangement of the schematic elements in the drawings is not meant to imply that a particular order or sequence of processing, or separation of processes, is required. Further, the inclusion of a schematic element in a drawing is not meant to imply that such element is required in all embodiments or that the features represented by such element may not be included in or combined with other elements in some embodiments.

Further, in the drawings, where connecting elements, such as solid or dashed lines or arrows, are used to illustrate a connection, relationship, or association between or among two or more other schematic elements, the absence of any such connecting elements is not meant to imply that no connection, relationship, or association can exist. In other words, some connections, relationships, or associations between elements are not shown in the drawings so as not to obscure the disclosure. In addition, for ease of illustration, a single connecting element is used to represent multiple connections, relationships or associations between elements. For example, where a connecting element represents a communication of signals, data, or instructions, it should be understood by those skilled in the art that such element represents one or multiple signal paths (e.g., a bus), as may be needed, to affect the communication.

Reference will now be made in detail to embodiments, examples of which are illustrated in the accompanying drawings. In the following detailed description, numerous specific details are set forth in order to provide a thorough understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

Several features are described hereafter that can each be used independently of one another or with any combination of other features. However, any individual feature may not address any of the problems discussed above or might only address one of the problems discussed above. Some of the problems discussed above might not be fully addressed by any of the features described herein. Although headings are provided, information related to a particular heading, but not found in the section having that heading, may also be found elsewhere in this description. Embodiments are described herein according to the following outline:

1. General Overview
   2. Hardware Overview
   3. Autonomous Vehicle Architecture
   4. Autonomous Vehicle Inputs
   5. Autonomous Vehicle Planning
   6. Autonomous Vehicle Control
   7. Steering Angle Calibration General Overview Vehicles rely on steering alignment for safe and reliable performance. In particular, autonomous vehicles rely on calibrated steering angle alignments for the autonomous vehicle's controller performance because a steering angle measurement reported by a steering angle sensor to a control module of the autonomous vehicle may not reflect the correct steering angle due to steering angle offset. The steering angle offset is defined as the deviation, in degrees or radians, from a zero reference position when the autonomous vehicle is travelling straight-ahead. The steering angle offset can be stationary or temporary. The stationary offset is often caused by deformation of axis or stays in the vehicle chassis, tire wear or service. The stationary steering angle offset persists until service is done. The temporary steering angle offset often occurs if the autonomous vehicle is carrying a load that is not evenly distributed, which can affect the steering. Also, certain driving conditions can cause temporary steering angle offsets, such as cross-winds, banking and cross slopes, ring-roads, long curves, etc.

The problems that can arise from incorrectly reported steering angle measurements include dangerous deviations in vehicle direction and control. To correct for steering angle offset, an autonomous vehicle obtains a measured steering angle from a steering angle sensor, a yaw rate measurement from a yaw rate sensor, and a known wheel base of the autonomous vehicle to determine an estimated steering angle offset using, for example, an adaptive filter or estimator (e.g., a linear quadratic estimator). The estimated steering angle offset is then used to determine an estimated yaw rate using a yaw rate model (e.g., a first order model). The estimated yaw rate can be compared with the measured yaw rate to trigger an action, such as alerting a passenger of the autonomous vehicle (or other entity) when the difference between the estimated yaw rate and the measured yaw rate exceeds a specified threshold value, and/or when the estimated steering angle offset exceeds a specified threshold. In an embodiment, the processing circuit performs a software calibration to correct the steering angle alignment by calibrating the measured steering angle and/or the yaw rate measurement using a steering calibration parameter.

Since errors in the measurements (e.g., measurement noise) and the yaw rate model (e.g., process noise) will be propagated into calculations performed by the processing circuit of the autonomous vehicle, these measurements are taken or used when such errors are likely to be small. For example, measurements can be taken or used when a first set of specified operating conditions are met, such as when the forward speed of the autonomous vehicle is below a threshold value (e.g., less than 5 m/s), the yaw rate is below a threshold value (e.g., less than abs (0.5 rad/s)) and a slip angle is below a threshold value (e.g., less than 2 degrees). Measurements can also be taken when a second set of specified operating conditions are met, such as when the speed of the autonomous vehicle is below a threshold value (e.g., less than 5 m/s), the yaw rate is below a threshold value (e.g., less than abs (0.5 rad/s)) and the lateral acceleration is below a threshold level (e.g., abs (1.0 m/s^2)). At low speeds there is less wheel slippage or skidding to distort the steering angle measurements and yaw rate measurements. In another example, measurements can be taken or used when a wheel base angle is less than a threshold value (e.g., 2 degrees). Additionally, by taking or using measurements only when the specified conditions are met a simplified yaw rate model (e.g., first order model) and estimator/filter formulation can be used.

To ensure that the sets of specified conditions disclosed above are met, the processing circuit can use digital map data or other resources to identify opportunities for taking measurements that can meet the specified sets of conditions, such as identifying (e.g., using a planning module) stretches of straight roadway to ensure that the lateral acceleration condition is met with speed limits to ensure that the forward speed condition is met. Additionally, measurements can be avoided when certain road surface conditions (e.g., wet, icy, oily road surfaces) are present that could cause erroneous measurements due to wheel slippage or skidding.

In an embodiment, when road surface conditions could affect the steering angle measurement and/or the yaw rate measurement (e.g., wet, icy, oily road surfaces), the processing circuit does not process any measurements and/or excludes (filters) the noisy measurements from the estimated steering angle offset calculations. The road surface conditions can be obtained from, for example, a wireless weather forecasting service, another vehicle (V2V) and/or using various road condition sensors. For example, road condition sensors onboard the vehicle or along the roadside (V2I) can measure road surface conditions, including but not limited to: surface temperature, water film height, freezing point, ice percentage, and a friction coefficient. The sensors may also detect chemicals or materials (e.g., salt, oil) on the road surface that affect the freezing point or friction coefficient.

In an embodiment, the steering angle can be measured when the autonomous vehicle is turning through a long curve in the roadway. For example, a left-turn steering angle component can be measured when the vehicle is turning left and a right-turn steering angle component can be measured when the vehicle is turning right. The processing circuit can compute the average of the measured left turn and right turn steering angle components to get the measured steering angle. In an embodiment, weights are applied to the left-turn and right-turn steering angle components, and the weighted components are summed to get the measured steering angle.

System Overview

FIG. 1 shows an example of an autonomous vehicle 100 having autonomous capability.

As used herein, the term "autonomous capability" refers to a function, feature, or facility that enables a vehicle to be partially or fully operated without real-time human intervention, including without limitation fully autonomous vehicles, highly autonomous vehicles, and conditionally autonomous vehicles.

As used herein, an autonomous vehicle (AV) is a vehicle that possesses autonomous capability.

As used herein, "vehicle" includes means of transportation of goods or people. For example, cars, buses, trains, airplanes, drones, trucks, boats, ships, submersibles, dirigibles, etc. A driverless car is an example of a vehicle.

As used herein, "trajectory" refers to a path or route to navigate an AV from a first spatiotemporal location to second spatiotemporal location. In an embodiment, the first spatiotemporal location is referred to as the initial or starting location and the second spatiotemporal location is referred to as the destination, final location, goal, goal position, or goal location. In some examples, a trajectory is made up of one or more segments (e.g., sections of road) and each segment is made up of one or more blocks (e.g., portions of a lane or intersection). In an embodiment, the spatiotemporal locations correspond to real world locations. For example, the spatiotemporal locations are pick up or drop-off locations to pick up or drop-off persons or goods.

As used herein, "sensor(s)" includes one or more hardware components that detect information about the environment surrounding the sensor. Some of the hardware components can include sensing components (e.g., image sensors, biometric sensors), transmitting and/or receiving components (e.g., laser or radio frequency wave transmitters and receivers), electronic components such as analog-to-digital converters, a data storage device (such as a RAM and/or a nonvolatile storage), software or firmware components and data processing components such as an ASIC (application-specific integrated circuit), a microprocessor and/or a microcontroller.

As used herein, a "scene description" is a data structure (e.g., list) or data stream that includes one or more classified or labeled objects detected by one or more sensors on the AV vehicle or provided by a source external to the AV.

As used herein, a "road" is a physical area that can be traversed by a vehicle, and may correspond to a named thoroughfare (e.g., city street, interstate freeway, etc.) or may correspond to an unnamed thoroughfare (e.g., a driveway in a house or office building, a section of a parking lot, a section of a vacant lot, a dirt path in a rural area, etc.). Because some vehicles (e.g., 4-wheel-drive pickup trucks, sport utility vehicles, etc.) are capable of traversing a variety of physical areas not specifically adapted for vehicle travel, a "road" may be a physical area not formally defined as a thoroughfare by any municipality or other governmental or administrative body.

As used herein, a "lane" is a portion of a road that can be traversed by a vehicle. A lane is sometimes identified based on lane markings. For example, a lane may correspond to most or all of the space between lane markings, or may correspond to only some (e.g., less than 50%) of the space between lane markings. For example, a road having lane markings spaced far apart might accommodate two or more vehicles between the markings, such that one vehicle can pass the other without traversing the lane markings, and thus could be interpreted as having a lane narrower than the space between the lane markings, or having two lanes between the lane markings. A lane could also be interpreted in the absence of lane markings. For example, a lane may be defined based on physical features of an environment, e.g., rocks and trees along a thoroughfare in a rural area or, e.g., natural obstructions to be avoided in an undeveloped area. A lane could also be interpreted independent of lane markings or physical features. For example, a lane could be interpreted based on an arbitrary path free of obstructions in an area that otherwise lacks features that would be interpreted as lane boundaries. In an example scenario, an AV could interpret a lane through an obstruction-free portion of a field or empty lot. In another example scenario, an AV could interpret a lane through a wide (e.g., wide enough for two or more lanes) road that does not have lane markings. In this scenario, the AV could communicate information about the lane to other AVs so that the other AVs can use the same lane information to coordinate path planning among themselves.

The term "over-the-air (OTA) client" includes any AV, or any electronic device (e.g., computer, controller, IoT device, electronic control unit (ECU)) that is embedded in, coupled to, or in communication with an AV.

The term "over-the-air (OTA) update" means any update, change, deletion or addition to software, firmware, data or configuration settings, or any combination thereof, that is delivered to an OTA client using proprietary and/or standardized wireless communications technology, including but not limited to: cellular mobile communications (e.g., 2G, 3G, 4G, 5G), radio wireless area networks (e.g., WiFi) and/or satellite Internet.

The term "edge node" means one or more edge devices coupled to a network that provide a portal for communication with AVs and can communicate with other edge nodes and a cloud based computing platform, for scheduling and delivering OTA updates to OTA clients.

The term "edge device" means a device that implements an edge node and provides a physical wireless access point (AP) into enterprise or service provider (e.g., VERIZON, AT&T) core networks. Examples of edge devices include but are not limited to: computers, controllers, transmitters, routers, routing switches, integrated access devices (IADs), multiplexers, metropolitan area network (MAN) and wide area network (WAN) access devices.

"One or more" includes a function being performed by one element, a function being performed by more than one element, e.g., in a distributed fashion, several functions being performed by one element, several functions being performed by several elements, or any combination of the above.

It will also be understood that, although the terms first, second, etc. are, in some instances, used herein to describe various elements, these elements should not be limited by these terms. These terms are only used to distinguish one element from another. For example, a first contact could be termed a second contact, and, similarly, a second contact could be termed a first contact, without departing from the scope of the various described embodiments. The first contact and the second contact are both contacts, but they are not the same contact.

The terminology used in the description of the various described embodiments herein is for the purpose of describing particular embodiments only and is not intended to be limiting. As used in the description of the various described embodiments and the appended claims, the singular forms "a," "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this description, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

As used herein, an AV system refers to the AV along with the array of hardware, software, stored data, and data generated in real-time that supports the operation of the AV. In an embodiment, the AV system is incorporated within the AV. In an embodiment, the AV system is spread across several locations. For example, some of the software of the AV system is implemented on a cloud computing environment similar to cloud computing environment 300 described below with respect to FIG. 3.

In general, this document describes technologies applicable to any vehicles that have one or more autonomous capabilities including fully autonomous vehicles, highly autonomous vehicles, and conditionally autonomous vehicles, such as so-called Level 5, Level 4 and Level 3 vehicles, respectively (see SAE International's standard J3016: Taxonomy and Definitions for Terms Related to On-Road Motor Vehicle Automated Driving Systems, which is incorporated by reference in its entirety, for more details on the classification of levels of autonomy in vehicles). The technologies described in this document are also applicable to partially autonomous vehicles and driver assisted vehicles, such as so-called Level 2 and Level 1 vehicles (see SAE International's standard J3016: Taxonomy and Definitions for Terms Related to On-Road Motor Vehicle Automated Driving Systems). In an embodiment, one or more of the Level 1, 2, 3, 4 and 5 vehicle systems may automate certain vehicle operations (e.g., steering, braking, and using maps) under certain operating conditions based on processing of sensor inputs. The technologies described in this document can benefit vehicles in any levels, ranging from fully autonomous vehicles to human-operated vehicles.

Autonomous vehicles have advantages over vehicles that require a human driver. One advantage is safety. For example, in 2016, the United States experienced 6 million automobile accidents, 2.4 million injuries, 40,000 fatalities, and 13 million vehicles in crashes, estimated at a societal cost of $910+ billion. U.S. traffic fatalities per 100 million miles traveled have been reduced from about six to about one from 1965 to 2015, in part due to additional safety measures deployed in vehicles. For example, an additional half second of warning that a crash is about to occur is believed to mitigate 60% of front-to-rear crashes. However, passive safety features (e.g., seat belts, airbags) have likely reached their limit in improving this number. Thus, active safety measures, such as automated control of a vehicle, are the likely next step in improving these statistics. Because human drivers are believed to be responsible for a critical pre-crash event in 95% of crashes, automated driving systems are likely to achieve better safety outcomes, e.g., by reliably recognizing and avoiding critical situations better than humans; making better decisions, obeying traffic laws, and predicting future events better than humans; and reliably controlling a vehicle better than a human.

Referring to FIG. 1, an AV system 120 operates the AV 100 along a trajectory 198 through an environment 190 to a destination 199 (sometimes referred to as a final location) while avoiding objects (e.g., natural obstructions 191, vehicles 193, pedestrians 192, cyclists, and other obstacles) and obeying rules of the road (e.g., rules of operation or driving preferences).

In an embodiment, the AV system 120 includes devices 101 that are instrumented to receive and act on operational commands from the computer processors 146. In an embodiment, computing processors 146 are similar to the processor 304 described below in reference to FIG. 3. Examples of devices 101 include a steering control 102, brakes 103, gears, accelerator pedal or other acceleration control mechanisms, windshield wipers, side-door locks, window controls, and turn-indicators.

In an embodiment, the AV system 120 includes sensors 121 for measuring or inferring properties of state or condition of the AV 100, such as the AV's position, linear and angular velocity and acceleration, and heading (e.g., an orientation of the leading end of AV 100). Example of sensors 121 are GPS, inertial measurement units (IMU) that measure both vehicle linear accelerations and angular rates, wheel speed sensors for measuring or estimating wheel slip ratios, wheel brake pressure or braking torque sensors, engine torque or wheel torque sensors, and steering angle and angular rate sensors.

In an embodiment, the sensors 121 also include sensors for sensing or measuring properties of the AV's environment. For example, monocular or stereo video cameras 122 in the visible light, infrared or thermal (or both) spectra, LiDAR 123, RADAR, ultrasonic sensors, time-of-flight (TOF) depth sensors, speed sensors, temperature sensors, humidity sensors, and precipitation sensors.

In an embodiment, the AV system 120 includes a data storage unit 142 and memory 144 for storing machine instructions associated with computer processors 146 or data collected by sensors 121. In an embodiment, the data storage unit 142 is similar to the ROM 308 or storage device 310 described below in relation to FIG. 3. In an embodiment, memory 144 is similar to the main memory 306 described below. In an embodiment, the data storage unit 142 and memory 144 store historical, real-time, and/or predictive information about the environment 190. In an embodiment, the stored information includes maps, driving performance, traffic congestion updates or weather conditions. In an embodiment, data relating to the environment 190 is transmitted to the AV 100 via a communications channel from a remotely located database 134.

In an embodiment, the AV system 120 includes communications devices 140 for communicating measured or inferred properties of other vehicles' states and conditions, such as positions, linear and angular velocities, linear and angular accelerations, and linear and angular headings to the AV 100. These devices include Vehicle-to-Vehicle (V2V) and Vehicle-to-Infrastructure (V2I) communication devices and devices for wireless communications over point-to-point or ad hoc networks or both. In an embodiment, the communications devices 140 communicate across the electromagnetic spectrum (including radio and optical communications) or other media (e.g., air and acoustic media). A combination of Vehicle-to-Vehicle (V2V) Vehicle-to-Infrastructure (V2I) communication (and, in some embodiments, one or more other types of communication) is sometimes referred to as Vehicle-to-Everything (V2X) communication. V2X communication typically conforms to one or more communications standards for communication with, between, and among autonomous vehicles.

In an embodiment, the communication devices 140 include communication interfaces. For example, wired, wireless, WiMAX, WiFi, Bluetooth, satellite, cellular, optical, near field, infrared, or radio interfaces. The communication interfaces transmit data from a remotely located database 134 to AV system 120. In an embodiment, the remotely located database 134 is embedded in a cloud computing environment 200 as described in FIG. 2. The communication interfaces 140 transmit data collected from sensors 121 or other data related to the operation of AV 100 to the remotely located database 134. In an embodiment, communication interfaces 140 transmit information that relates to teleoperations to the AV 100. In some embodiments, the AV 100 communicates with other remote (e.g., "cloud") servers 136.

In an embodiment, the remotely located database 134 also stores and transmits digital data (e.g., storing data such as road and street locations). Such data is stored on the memory 144 on the AV 100, or transmitted to the AV 100 via a communications channel from the remotely located database 134.

In an embodiment, the remotely located database 134 stores and transmits historical information about driving properties (e.g., speed and acceleration profiles) of vehicles that have previously traveled along trajectory 198 at similar times of day. In one implementation, such data may be stored on the memory 144 on the AV 100, or transmitted to the AV 100 via a communications channel from the remotely located database 134.

Computing devices 146 located on the AV 100 algorithmically generate control actions based on both real-time sensor data and prior information, allowing the AV system 120 to execute its autonomous driving capabilities.

In an embodiment, the AV system 120 includes computer peripherals 132 coupled to computing devices 146 for providing information and alerts to, and receiving input from, a user (e.g., an occupant or a remote user) of the AV 100. In an embodiment, peripherals 132 are similar to the display 312, input device 314, and cursor controller 316 discussed below in reference to FIG. 3. The coupling is wireless or wired. Any two or more of the interface devices may be integrated into a single device.

Figure 2:
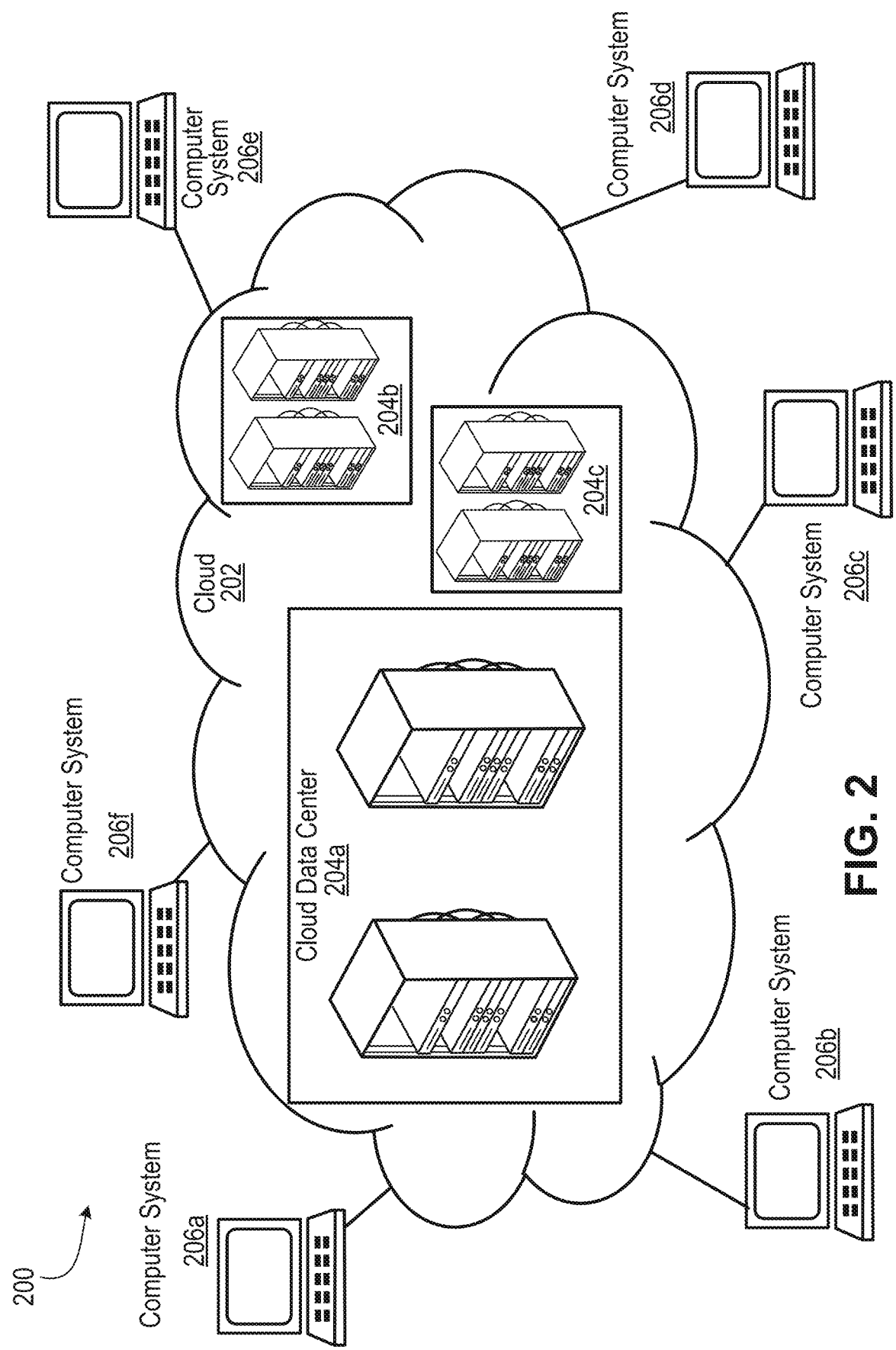
FIG. 2 illustrates an example "cloud" computing environment, in accordance with an embodiment.

FIG. 2 illustrates an example "cloud" computing environment. Cloud computing is a model of service delivery for enabling convenient, on-demand network access to a shared pool of configurable computing resources (e.g. networks, network bandwidth, servers, processing, memory, storage, applications, virtual machines, and services). In typical cloud computing systems, one or more large cloud data centers house the machines used to deliver the services provided by the cloud. Referring now to FIG. 2, the cloud computing environment 200 includes cloud data centers 204a, 204b, and 204c that are interconnected through the cloud 202. Data centers 204a, 204b, and 204c provide cloud computing services to computer systems 206a, 206b, 206c, 206d, 206e, and 206f connected to cloud 202.

The cloud computing environment 200 includes one or more cloud data centers. In general, a cloud data center, for example the cloud data center 204a shown in FIG. 2, refers to the physical arrangement of servers that make up a cloud, for example the cloud 202 shown in FIG. 2, or a particular portion of a cloud. For example, servers are physically arranged in the cloud datacenter into rooms, groups, rows, and racks. A cloud datacenter has one or more zones, which include one or more rooms of servers. Each room has one or more rows of servers, and each row includes one or more racks. Each rack includes one or more individual server nodes. In some implementation, servers in zones, rooms, racks, and/or rows are arranged into groups based on physical infrastructure requirements of the datacenter facility, which include power, energy, thermal, heat, and/or other requirements. In an embodiment, the server nodes are similar to the computer system described in FIG. 3. The data center 204a has many computing systems distributed through many racks.

The cloud 202 includes cloud data centers 204a, 204b, and 204c along with the network and networking resources (for example, networking equipment, nodes, routers, switches, and networking cables) that interconnect the cloud data centers 204a, 204b, and 204c and help facilitate the computing systems' 206a-f access to cloud computing services. In an embodiment, the network represents any combination of one or more local networks, wide area networks, or internetworks coupled using wired or wireless links deployed using terrestrial or satellite connections. Data exchanged over the network, is transferred using any number of network layer protocols, such as Internet Protocol (IP), Multiprotocol Label Switching (MPLS), Asynchronous Transfer Mode (ATM), Frame Relay, etc. Furthermore, in embodiments where the network represents a combination of multiple sub-networks, different network layer protocols are used at each of the underlying sub-networks. In some embodiments, the network represents one or more interconnected internetworks, such as the public Internet.

The computing systems 206a-f or cloud computing services consumers are connected to the cloud 202 through network links and network adapters. In an embodiment, the computing systems 206a-f are implemented as various computing devices, for example servers, desktops, laptops, tablet, smartphones, Internet of Things (IoT) devices, autonomous vehicles (including, cars, drones, shuttles, trains, buses, etc.) and consumer electronics. In an embodiment, the computing systems 206a-f are implemented in or as a part of other systems.

Figure 3:
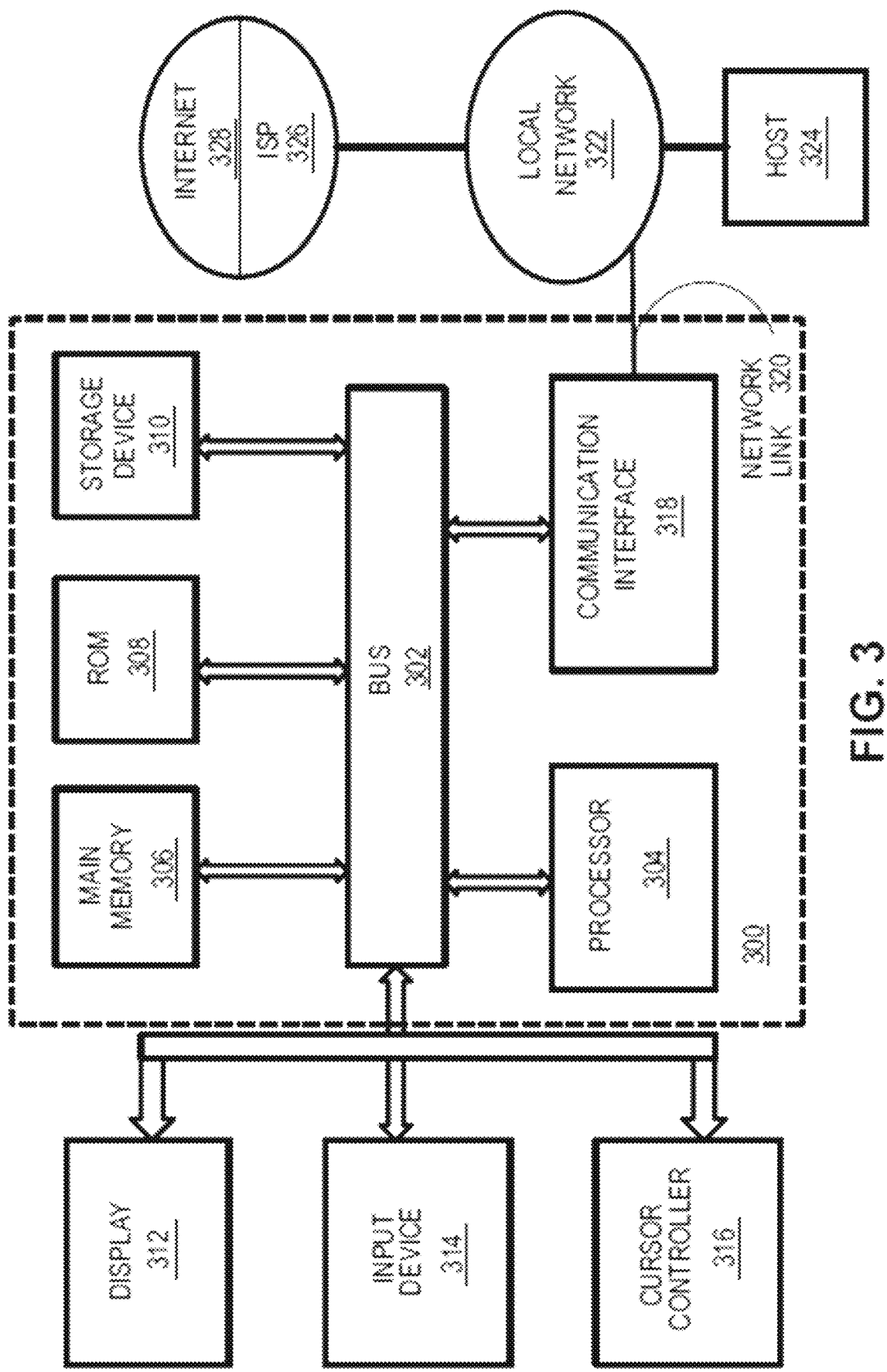
FIG. 3 illustrates a computer system, in accordance with an embodiment.

FIG. 3 illustrates a computer system 300. In an implementation, the computer system 300 is a special purpose computing device. The special-purpose computing device is hard-wired to perform the techniques or includes digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. In various embodiments, the special-purpose computing devices are desktop computer systems, portable computer systems, handheld devices, network devices or any other device that incorporates hard-wired and/or program logic to implement the techniques.

In an embodiment, the computer system 300 includes a bus 302 or other communication mechanism for communicating information, and a hardware processor 304 coupled with a bus 302 for processing information. The hardware processor 304 is, for example, a general-purpose microprocessor. The computer system 300 also includes a main memory 306, such as a random-access memory (RAM) or other dynamic storage device, coupled to the bus 302 for storing information and instructions to be executed by processor 304. In one implementation, the main memory 306 is used for storing temporary variables or other intermediate information during execution of instructions to be executed by the processor 304. Such instructions, when stored in non-transitory storage media accessible to the processor 304, render the computer system 300 into a special-purpose machine that is customized to perform the operations specified in the instructions.

In an embodiment, the computer system 300 further includes a read only memory (ROM) 308 or other static storage device coupled to the bus 302 for storing static information and instructions for the processor 304. A storage device 310, such as a magnetic disk, optical disk, solid-state drive, or three-dimensional cross point memory is provided and coupled to the bus 302 for storing information and instructions.

In an embodiment, the computer system 300 is coupled via the bus 302 to a display 312, such as a cathode ray tube (CRT), a liquid crystal display (LCD), plasma display, light emitting diode (LED) display, or an organic light emitting diode (OLED) display for displaying information to a computer user. An input device 314, including alphanumeric and other keys, is coupled to bus 302 for communicating information and command selections to the processor 304. Another type of user input device is a cursor controller 316, such as a mouse, a trackball, a touch-enabled display, or cursor direction keys for communicating direction information and command selections to the processor 304 and for controlling cursor movement on the display 312. This input device typically has two degrees of freedom in two axes, a first axis (e.g., x-axis) and a second axis (e.g., y-axis), that allows the device to specify positions in a plane.

According to one embodiment, the techniques herein are performed by the computer system 300 in response to the processor 304 executing one or more sequences of one or more instructions contained in the main memory 306. Such instructions are read into the main memory 306 from another storage medium, such as the storage device 310. Execution of the sequences of instructions contained in the main memory 306 causes the processor 304 to perform the process steps described herein. In alternative embodiments, hard-wired circuitry is used in place of or in combination with software instructions.

The term "storage media" as used herein refers to any non-transitory media that store data and/or instructions that cause a machine to operate in a specific fashion. Such storage media includes non-volatile media and/or volatile media. Non-volatile media includes, for example, optical disks, magnetic disks, solid-state drives, or three-dimensional cross point memory, such as the storage device 310. Volatile media includes dynamic memory, such as the main memory 306. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NV-RAM, or any other memory chip or cartridge.

Storage media is distinct from but may be used in conjunction with transmission media. Transmission media participates in transferring information between storage media. For example, transmission media includes coaxial cables, copper wire and fiber optics, including the wires that comprise the bus 302. Transmission media can also take the form of acoustic or light waves, such as those generated during radio-wave and infrared data communications.

In an embodiment, various forms of media are involved in carrying one or more sequences of one or more instructions to the processor 304 for execution. For example, the instructions are initially carried on a magnetic disk or solid-state drive of a remote computer. The remote computer loads the instructions into its dynamic memory and send the instructions over a telephone line using a modem. A modem local to the computer system 300 receives the data on the telephone line and use an infrared transmitter to convert the data to an infrared signal. An infrared detector receives the data carried in the infrared signal and appropriate circuitry places the data on the bus 302. The bus 302 carries the data to the main memory 306, from which processor 304 retrieves and executes the instructions. The instructions received by the main memory 306 may optionally be stored on the storage device 310 either before or after execution by processor 304.

The computer system 300 also includes a communication interface 318 coupled to the bus 302. The communication interface 318 provides a two-way data communication coupling to a network link 320 that is connected to a local network 322. For example, the communication interface 318 is an integrated service digital network (ISDN) card, cable modem, satellite modem, or a modem to provide a data communication connection to a corresponding type of telephone line. As another example, the communication interface 318 is a local area network (LAN) card to provide a data communication connection to a compatible LAN. In some implementations, wireless links are also implemented. In any such implementation, the communication interface 318 sends and receives electrical, electromagnetic, or optical signals that carry digital data streams representing various types of information.

The network link 320 typically provides data communication through one or more networks to other data devices. For example, the network link 320 provides a connection through the local network 322 to a host computer 324 or to a cloud data center or equipment operated by an Internet Service Provider (ISP) 326. The ISP 326 in turn provides data communication services through the world-wide packet data communication network now commonly referred to as the "Internet" 328. The local network 322 and Internet 328 both use electrical, electromagnetic or optical signals that carry digital data streams. The signals through the various networks and the signals on the network link 320 and through the communication interface 318, which carry the digital data to and from the computer system 300, are example forms of transmission media. In an embodiment, the network 320 contains the cloud 202 or a part of the cloud 202 described above.

The computer system 300 sends messages and receives data, including program code, through the network(s), the network link 320, and the communication interface 318. In an embodiment, the computer system 300 receives code for processing. The received code is executed by the processor 304 as it is received, and/or stored in storage device 310, or other non-volatile storage for later execution.

Autonomous Vehicle Architecture

Figure 4:
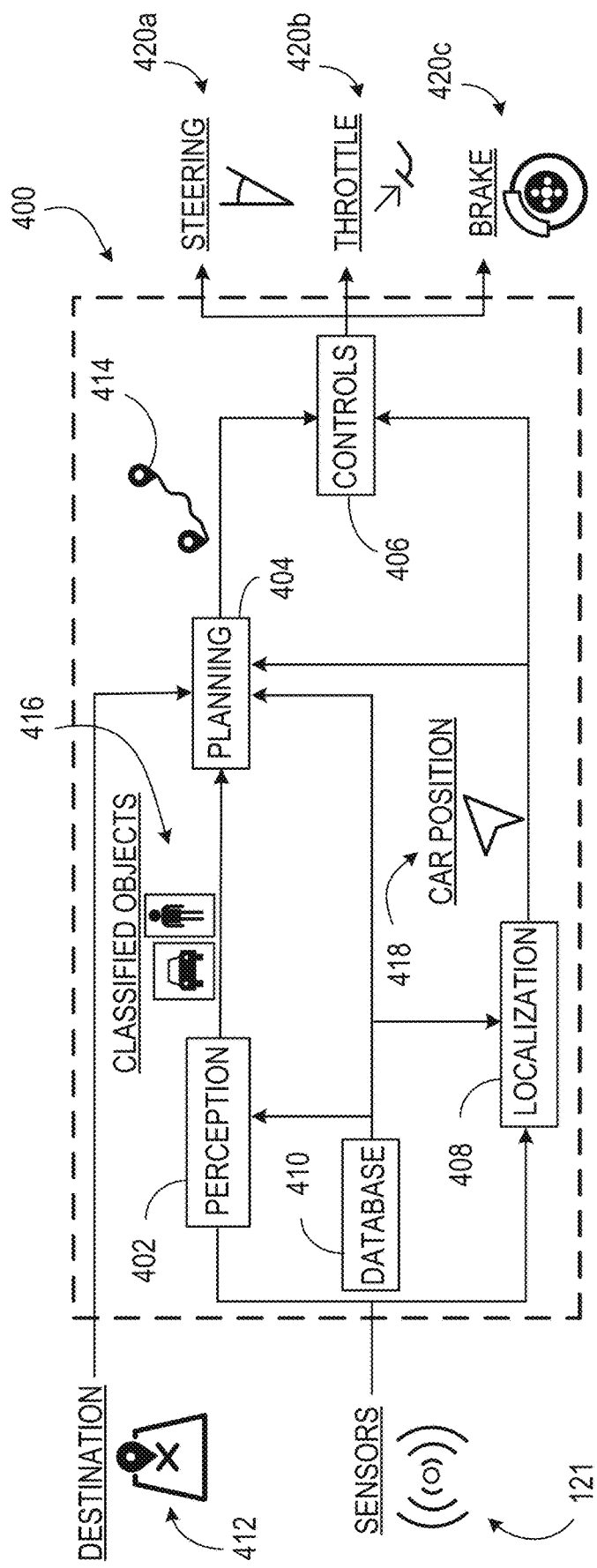
FIG. 4 shows an example architecture for an autonomous vehicle, in accordance with an embodiment.

FIG. 4 shows an example architecture 400 for an autonomous vehicle (e.g., the AV 100 shown in FIG. 1). The architecture 400 includes a perception module 402 (sometimes referred to as a perception circuit), a planning module 404 (sometimes referred to as a planning circuit), a control module 406 (sometimes referred to as a control circuit), a localization module 408 (sometimes referred to as a localization circuit), and a database module 410 (sometimes referred to as a database circuit). Each module plays a role in the operation of the AV 100. Together, the modules 402, 404, 406, 408, and 410 may be part of the AV system 120 shown in FIG. 1. In some embodiments, any of the modules 402, 404, 406, 408, and 410 is a combination of computer software (e.g., executable code stored on a computer-readable medium) and computer hardware (e.g., one or more microprocessors, microcontrollers, application-specific integrated circuits [ASICs]), hardware memory devices, other types of integrated circuits, other types of computer hardware, or a combination of any or all of these things). Each of the modules 402, 404, 406, 408, and 410 is sometimes referred to as a processing circuit (e.g., computer hardware, computer software, or a combination of the two). A combination of any or all of the modules 402, 404, 406, 408, and 410 is also an example of a processing circuit.

In use, the planning module 404 receives data representing a destination 412 and determines data representing a trajectory 414 (sometimes referred to as a route) that can be traveled by the AV 100 to reach (e.g., arrive at) the destination 412. In order for the planning module 404 to determine the data representing the trajectory 414, the planning module 404 receives data from the perception module 402, the localization module 408, and the database module 410.

The perception module 402 identifies nearby physical objects using one or more sensors 121, e.g., as also shown in FIG. 1. The objects are classified (e.g., grouped into types such as pedestrian, bicycle, automobile, traffic sign, etc.) and a scene description including the classified objects 416 is provided to the planning module 404.

The planning module 404 also receives data representing the AV position 418 from the localization module 408. The localization module 408 determines the AV position by using data from the sensors 121 and data from the database module 410 (e.g., a geographic data) to calculate a position. For example, the localization module 408 uses data from a GNSS (Global Navigation Satellite System) sensor and geographic data to calculate a longitude and latitude of the AV. In an embodiment, data used by the localization module 408 includes high-precision maps of the roadway geometric properties, maps describing road network connectivity properties, maps describing roadway physical properties (such as traffic speed, traffic volume, the number of vehicular and cyclist traffic lanes, lane width, lane traffic directions, or lane marker types and locations, or combinations of them), and maps describing the spatial locations of road features such as crosswalks, traffic signs or other travel signals of various types. In an embodiment, the high-precision maps are constructed by adding data through automatic or manual annotation to low-precision maps.

The control module 406 receives the data representing the trajectory 414 and the data representing the AV position 418 and operates the control functions 420a-c (e.g., steering, throttling, braking, ignition) of the AV in a manner that will cause the AV 100 to travel the trajectory 414 to the destination 412. For example, if the trajectory 414 includes a left turn, the control module 406 will operate the control functions 420a-c in a manner such that the steering angle of the steering function will cause the AV 100 to turn left and the throttling and braking will cause the AV 100 to pause and wait for passing pedestrians or vehicles before the turn is made.

Autonomous Vehicle Inputs

Figure 5:
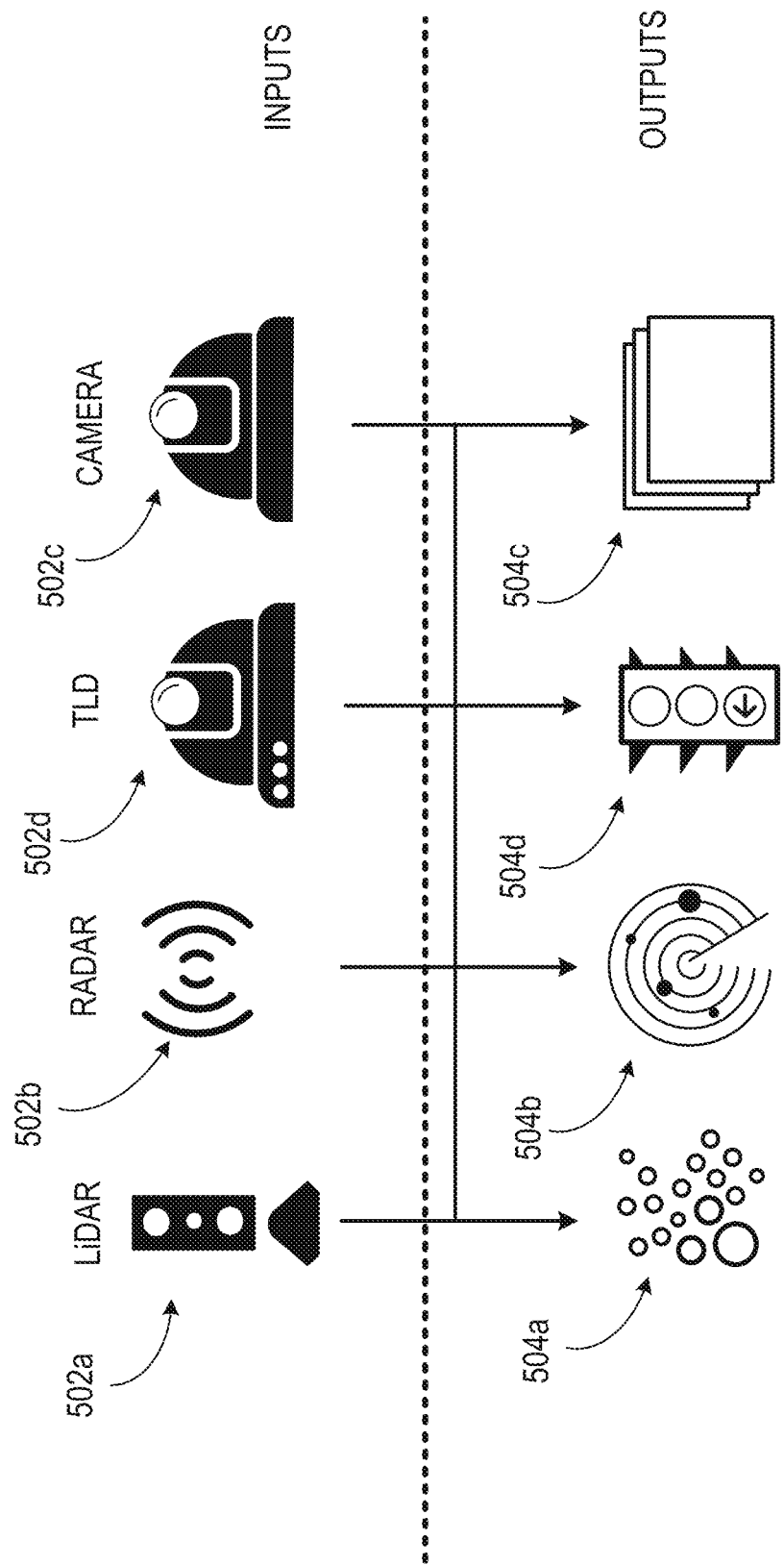
FIG. 5 shows an example of inputs and outputs that may be used by a perception module, in accordance with an embodiment.

FIG. 5 shows an example of inputs 502a-d (e.g., sensors 121 shown in FIG. 1) and outputs 504a-d (e.g., sensor data) that is used by the perception module 402 (FIG. 4). One input 502a is a LiDAR (Light Detection and Ranging) system (e.g., LiDAR 123 shown in FIG. 1). LiDAR is a technology that uses light (e.g., bursts of light such as infrared light) to obtain data about physical objects in its line of sight. A LiDAR system produces LiDAR data as output 504a. For example, LiDAR data is collections of 3D or 2D points (also known as a point clouds) that are used to construct a representation of the environment 190.

Another input 502b is a RADAR system. RADAR is a technology that uses radio waves to obtain data about nearby physical objects. RADARs can obtain data about objects not within the line of sight of a LiDAR system. A RADAR system 502b produces RADAR data as output 504b. For example, RADAR data are one or more radio frequency electromagnetic signals that are used to construct a representation of the environment 190.

Another input 502c is a camera system. A camera system uses one or more cameras (e.g., digital cameras using a light sensor such as a charge-coupled device [CCD]) to obtain information about nearby physical objects. A camera system produces camera data as output 504c. Camera data often takes the form of image data (e.g., data in an image data format such as RAW, JPEG, PNG, etc.). In some examples, the camera system has multiple independent cameras, e.g., for the purpose of stereopsis (stereo vision), which enables the camera system to perceive depth. Although the objects perceived by the camera system are described here as "nearby," this is relative to the AV. In use, the camera system may be configured to "see" objects far, e.g., up to a kilometer or more ahead of the AV. Accordingly, the camera system may have features such as sensors and lenses that are optimized for perceiving objects that are far away.

Another input 502d is a traffic light detection (TLD) system. A TLD system uses one or more cameras to obtain information about traffic lights, street signs, and other physical objects that provide visual navigation information. A TLD system produces TLD data as output 504d. TLD data often takes the form of image data (e.g., data in an image data format such as RAW, JPEG, PNG, etc.). A TLD system differs from a system incorporating a camera in that a TLD system uses a camera with a wide field of view (e.g., using a wide-angle lens or a fish-eye lens) in order to obtain information about as many physical objects providing visual navigation information as possible, so that the AV 100 has access to all relevant navigation information provided by these objects. For example, the viewing angle of the TLD system may be about 120 degrees or more.

In some embodiments, outputs 504a-d are combined using a sensor fusion technique. Thus, either the individual outputs 504a-d are provided to other systems of the AV 100 (e.g., provided to a planning module 404 as shown in FIG. 4), or the combined output can be provided to the other systems, either in the form of a single combined output or multiple combined outputs of the same type (e.g., using the same combination technique or combining the same outputs or both) or different types type (e.g., using different respective combination techniques or combining different respective outputs or both). In some embodiments, an early fusion technique is used. An early fusion technique is characterized by combining outputs before one or more data processing steps are applied to the combined output. In some embodiments, a late fusion technique is used. A late fusion technique is characterized by combining outputs after one or more data processing steps are applied to the individual outputs.

Figure 6:
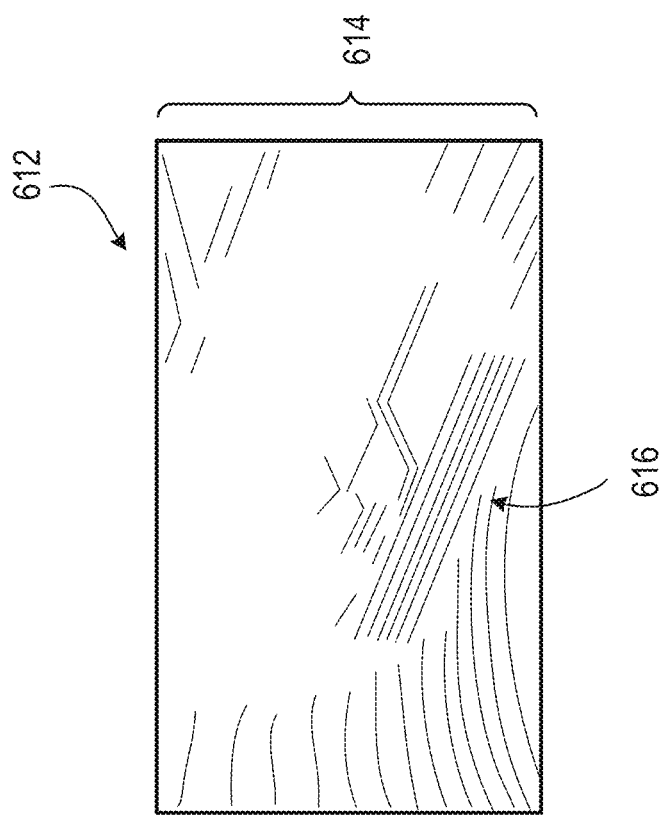
FIG. 6 shows an example of a LiDAR system, in accordance with an embodiment.
Figure 6:
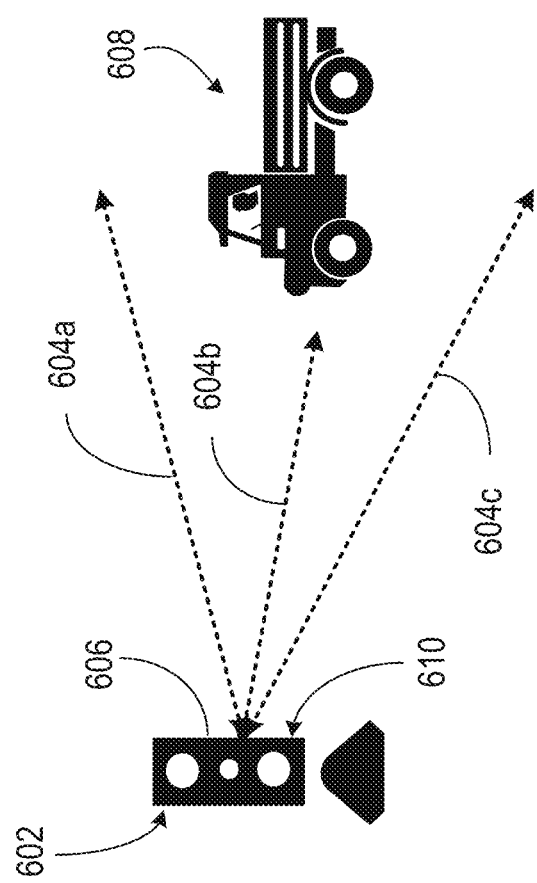

FIG. 6 shows an example of a LiDAR system 602 (e.g., the input 502a shown in FIG. 5). The LiDAR system 602 emits light 604a-c from a light emitter 606 (e.g., a laser transmitter). Light emitted by a LiDAR system is typically not in the visible spectrum; for example, infrared light is often used. Some of the light 604b emitted encounters a physical object 608 (e.g., a vehicle) and reflects back to the LiDAR system 602. (Light emitted from a LiDAR system typically does not penetrate physical objects, e.g., physical objects in solid form.) The LiDAR system 602 also has one or more light detectors 610, which detect the reflected light. In an embodiment, one or more data processing systems associated with the LiDAR system generates an image 612 representing the field of view 614 of the LiDAR system. The image 612 includes information that represents the boundaries 616 of a physical object 608. In this way, the image 612 is used to determine the boundaries 616 of one or more physical objects near an AV.

Figure 7:
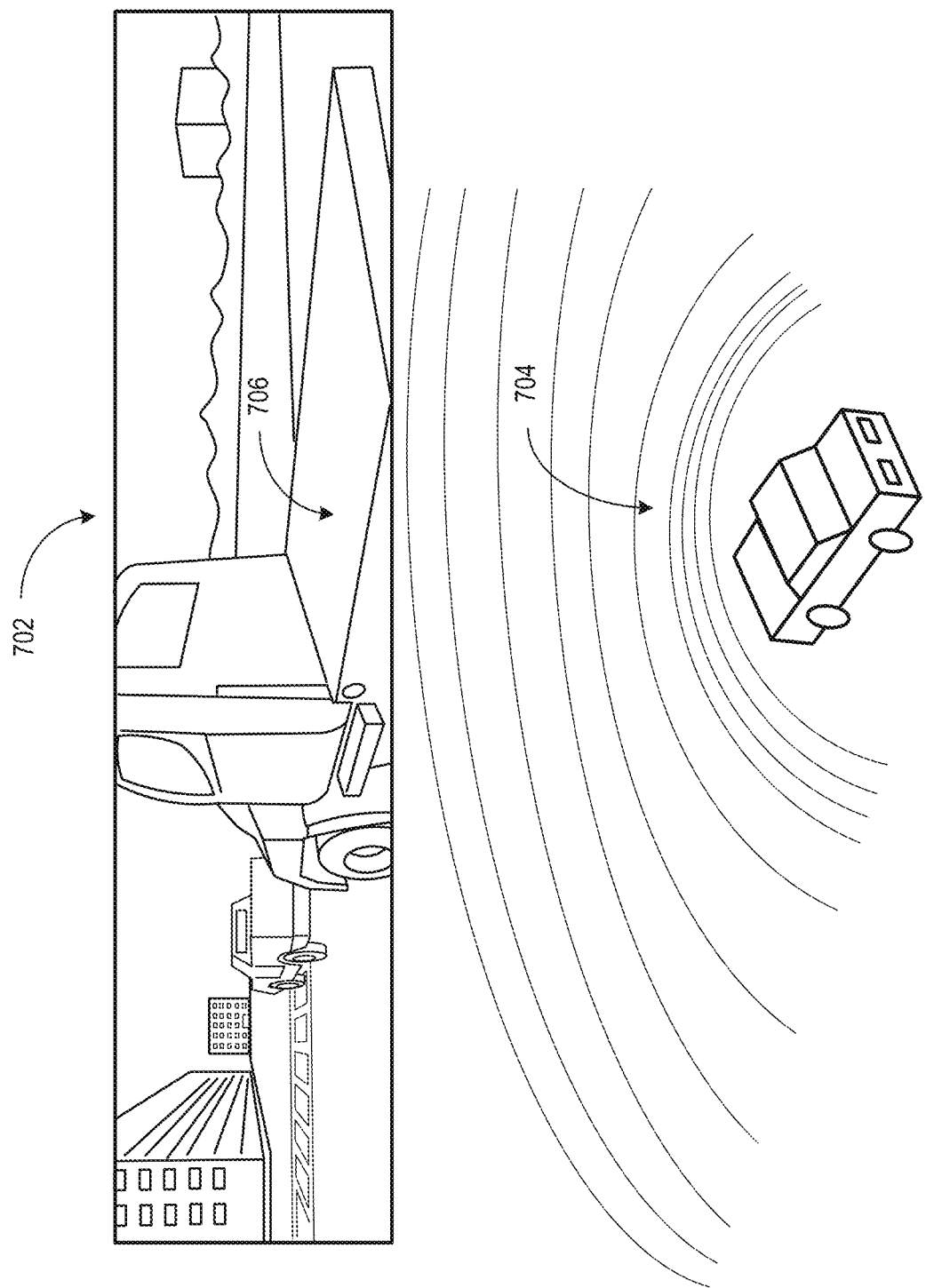
FIG. 7 shows the LiDAR system in operation, in accordance with an embodiment.

FIG. 7 shows the LiDAR system 602 in operation. In the scenario shown in this figure, the AV 100 receives both camera system output 504c in the form of an image 702 and LiDAR system output 504a in the form of LiDAR data points 704. In use, the data processing systems of the AV 100 compare the image 702 to the data points 704. In particular, a physical object 706 identified in the image 702 is also identified among the data points 704. In this way, the AV 100 perceives the boundaries of the physical object based on the contour and density of the data points 704.

Figure 8:
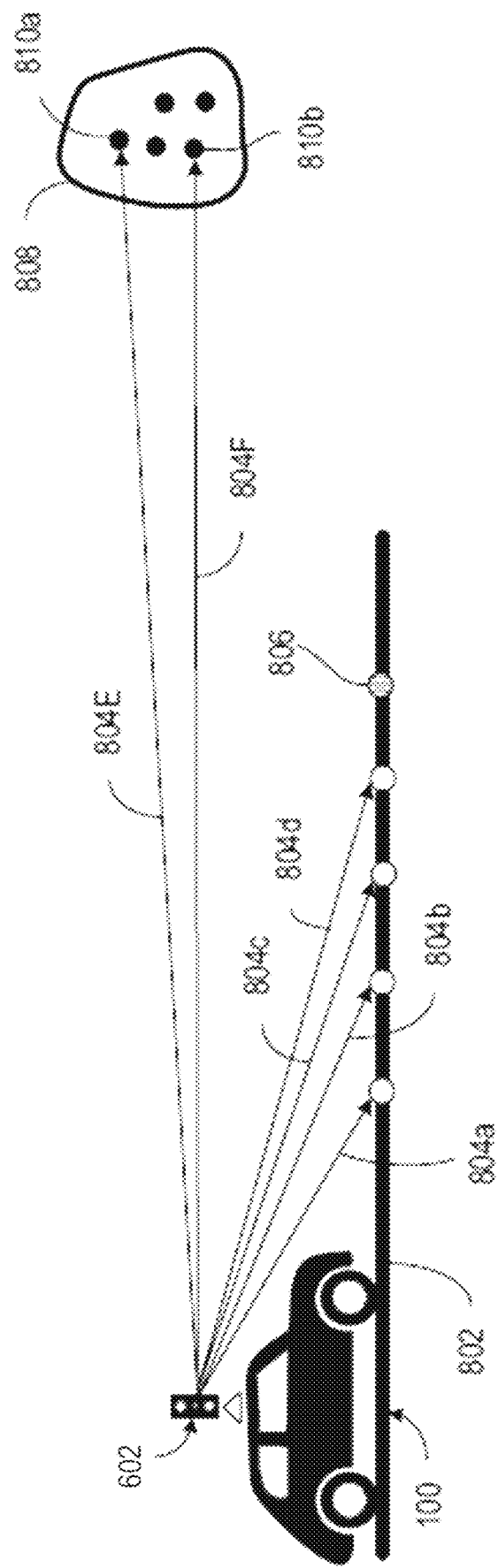
FIG. 8 shows the operation of the LiDAR system in additional detail, in accordance with an embodiment.

FIG. 8 shows the operation of the LiDAR system 602 in additional detail. As described above, the AV 100 detects the boundary of a physical object based on characteristics of the data points detected by the LiDAR system 602. As shown in FIG. 8, a flat object, such as the ground 802, will reflect light 804a-d emitted from a LiDAR system 602 in a consistent manner. Put another way, because the LiDAR system 602 emits light using consistent spacing, the ground 802 will reflect light back to the LiDAR system 602 with the same consistent spacing. As the AV 100 travels over the ground 802, the LiDAR system 602 will continue to detect light reflected by the next valid ground point 806 if nothing is obstructing the road. However, if an object 808 obstructs the road, light 804*e-f* emitted by the LiDAR system 602 will be reflected from points 810*a-b* in a manner inconsistent with the expected consistent manner. From this information, the AV 100 can determine that the object 808 is present.

Path Planning

Figure 9:
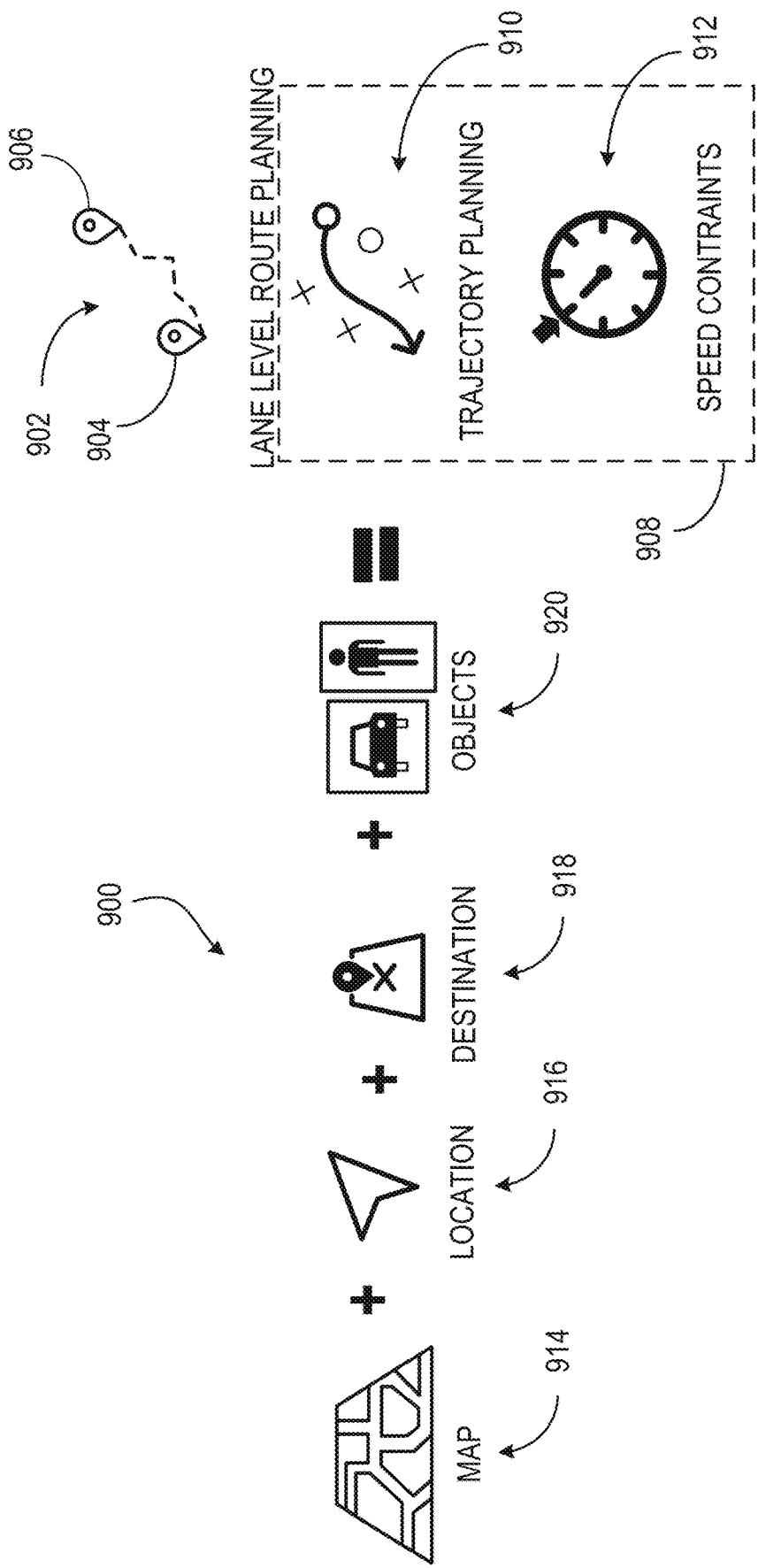
FIG. 9 shows a block diagram of the relationships between inputs and outputs of a planning module, in accordance with an embodiment.

FIG. 9 shows a block diagram 900 of the relationships between inputs and outputs of a planning module 404 (e.g., as shown in FIG. 4). In general, the output of a planning module 404 is a route 902 from a start point 904 (e.g., source location or initial location), and an end point 906 (e.g., destination or final location). The route 902 is typically defined by one or more segments. For example, a segment is a distance to be traveled over at least a portion of a street, road, highway, driveway, or other physical area appropriate for automobile travel. In some examples, e.g., if the AV 100 is an off-road capable vehicle such as a four-wheel-drive (4WD) or all-wheel-drive (AWD) car, SUV, pick-up truck, or the like, the route 902 includes "off-road" segments such as unpaved paths or open fields.

In addition to the route 902, a planning module also outputs lane-level route planning data 908. The lane-level route planning data 908 is used to traverse segments of the route 902 based on conditions of the segment at a particular time. For example, if the route 902 includes a multi-lane highway, the lane-level route planning data 908 includes trajectory planning data 910 that the AV 100 can use to choose a lane among the multiple lanes, e.g., based on whether an exit is approaching, whether one or more of the lanes have other vehicles, or other factors that vary over the course of a few minutes or less. Similarly, in some implementations, the lane-level route planning data 908 includes speed constraints 912 specific to a segment of the route 902. For example, if the segment includes pedestrians or unexpected traffic, the speed constraints 912 may limit the AV 100 to a travel speed slower than an expected speed, e.g., a speed based on speed limit data for the segment.

In an embodiment, the inputs to the planning module 404 includes database data 914 (e.g., from the database module 410 shown in FIG. 4), current location data 916 (e.g., the AV position 418 shown in FIG. 4), destination data 918 (e.g., for the destination 412 shown in FIG. 4), and object data 920 (e.g., the classified objects 416 as perceived by the perception module 402 as shown in FIG. 4). In some embodiments, the database data 914 includes rules used in planning. Rules are specified using a formal language, e.g., using Boolean logic. In any given situation encountered by the AV 100, at least some of the rules will apply to the situation. A rule applies to a given situation if the rule has conditions that are met based on information available to the AV 100, e.g., information about the surrounding environment. Rules can have priority. For example, a rule that says, "if the road is a freeway, move to the leftmost lane" can have a lower priority than "if the exit is approaching within a mile, move to the rightmost lane."

Figure 10:
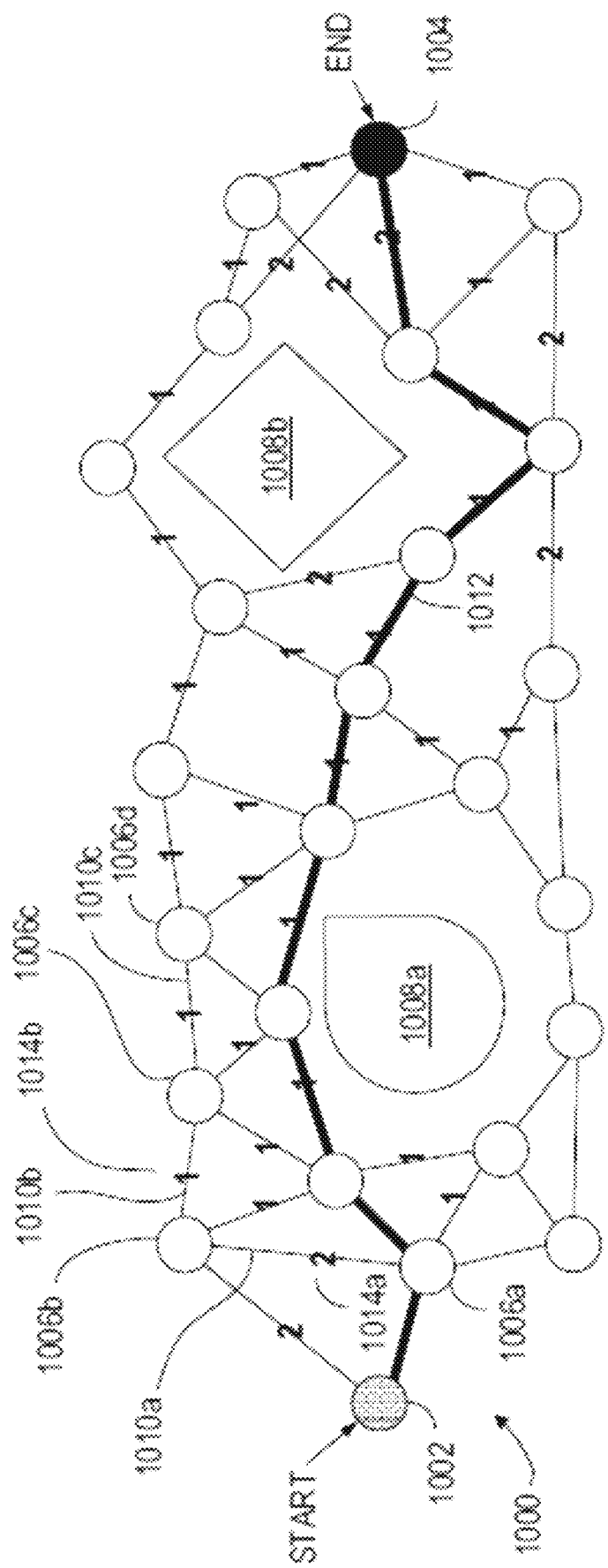
FIG. 10 shows a directed graph used in path planning, in accordance with an embodiment.

FIG. 10 shows a directed graph 1000 used in path planning, e.g., by the planning module 404 (FIG. 4). In general, a directed graph 1000 like the one shown in FIG. 10 is used to determine a path between any start point 1002 and end point 1004. In real-world terms, the distance separating the start point 1002 and end point 1004 may be relatively large (e.g., in two different metropolitan areas) or may be relatively small (e.g., two intersections abutting a city block or two lanes of a multi-lane road).

In an embodiment, the directed graph 1000 has nodes 1006*a-d* representing different locations between the start point 1002 and the end point 1004 that could be occupied by an AV 100. In some examples, e.g., when the start point 1002 and end point 1004 represent different metropolitan areas, the nodes 1006*a-d* represent segments of roads. In some examples, e.g., when the start point 1002 and the end point 1004 represent different locations on the same road, the nodes 1006*a-d* represent different positions on that road. In this way, the directed graph 1000 includes information at varying levels of granularity. In an embodiment, a directed graph having high granularity is also a subgraph of another directed graph having a larger scale. For example, a directed graph in which the start point 1002 and the end point 1004 are far away (e.g., many miles apart) has most of its information at a low granularity and is based on stored data, but also includes some high granularity information for the portion of the graph that represents physical locations in the field of view of the AV 100.

The nodes 1006*a-d* are distinct from objects 1008*a-b* which cannot overlap with a node. In an embodiment, when granularity is low, the objects 1008*a-b* represent regions that cannot be traversed by automobile, e.g., areas that have no streets or roads. When granularity is high, the objects 1008*a-b* represent physical objects in the field of view of the AV 100, e.g., other automobiles, pedestrians, or other entities with which the AV 100 cannot share physical space. In an embodiment, some or all of the objects 1008*a-b* are a static objects (e.g., an object that does not change position such as a street lamp or utility pole) or dynamic objects (e.g., an object that is capable of changing position such as a pedestrian or other car).

The nodes 1006*a-d* are connected by edges 1010*a-c*. If two nodes 1006*a-b* are connected by an edge 1010*a*, it is possible for an AV 100 to travel between one node 1006*a* and the other node 1006*b*, e.g., without having to travel to an intermediate node before arriving at the other node 1006*b*. (When we refer to an AV 100 traveling between nodes, we mean that the AV 100 travels between the two physical positions represented by the respective nodes.) The edges 1010*a-c* are often bidirectional, in the sense that an AV 100 travels from a first node to a second node, or from the second node to the first node. In an embodiment, edges 1010*a-c* are unidirectional, in the sense that an AV 100 can travel from a first node to a second node, however the AV 100 cannot travel from the second node to the first node. Edges 1010*a-c* are unidirectional when they represent, for example, one-way streets, individual lanes of a street, road, or highway, or other features that can only be traversed in one direction due to legal or physical constraints.

In an embodiment, the planning module 404 uses the directed graph 1000 to identify a path 1012 made up of nodes and edges between the start point 1002 and end point 1004.

An edge 1010*a-c* has an associated cost 1014*a-b*. The cost 1014*a-b* is a value that represents the resources that will be expended if the AV 100 chooses that edge. A typical resource is time. For example, if one edge 1010*a* represents a physical distance that is twice that as another edge 1010*b*, then the associated cost 1014*a* of the first edge 1010*a* may be twice the associated cost 1014*b* of the second edge 1010*b*. Other factors that affect time include expected traffic, number of intersections, speed limit, etc. Another typical resource is fuel economy. Two edges 1010*a-b* may represent the same physical distance, but one edge 1010*a* may require more fuel than another edge 1010*b*, e.g., because of road conditions, expected weather, etc.

When the planning module 404 identifies a path 1012 between the start point 1002 and end point 1004, the planning module 404 typically chooses a path optimized for cost, e.g., the path that has the least total cost when the individual costs of the edges are added together.

Autonomous Vehicle Control

Figure 11:
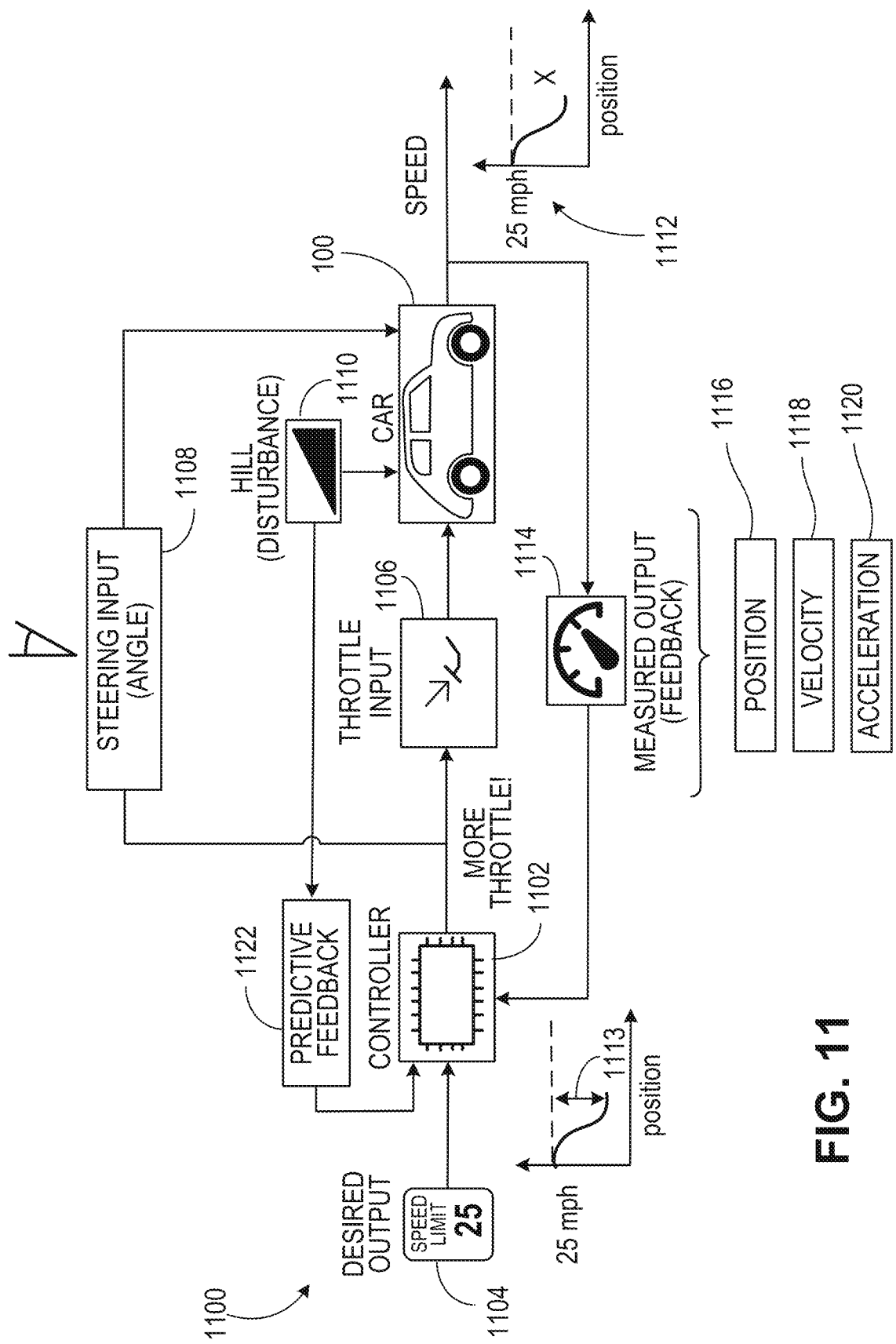
FIG. 11 shows a block diagram of the inputs and outputs of a control module, in accordance with an embodiment.

FIG. 11 shows a block diagram 1100 of the inputs and outputs of a control module 406 (e.g., as shown in FIG. 4). A control module operates in accordance with a controller 1102 which includes, for example, one or more processors (e.g., one or more computer processors such as microprocessors or microcontrollers or both) similar to processor 304, short-term and/or long-term data storage (e.g., memory random-access memory or flash memory or both) similar to main memory 306, ROM 1308, and storage device 210, and instructions stored in memory that carry out operations of the controller 1102 when the instructions are executed (e.g., by the one or more processors).

In an embodiment, the controller 1102 receives data representing a desired output 1104. The desired output 1104 typically includes a velocity, e.g., a speed and a heading. The desired output 1104 can be based on, for example, data received from a planning module 404 (e.g., as shown in FIG. 4). In accordance with the desired output 1104, the controller 1102 produces data usable as a throttle input 1106 and a steering input 1108. The throttle input 1106 represents the magnitude in which to engage the throttle (e.g., acceleration control) of an AV 100, e.g., by engaging the steering pedal, or engaging another throttle control, to achieve the desired output 1104. In some examples, the throttle input 1106 also includes data usable to engage the brake (e.g., deceleration control) of the AV 100. The steering input 1108 represents a steering angle, e.g., the angle at which the steering control (e.g., steering wheel, steering angle actuator, or other functionality for controlling steering angle) of the AV should be positioned to achieve the desired output 1104.

In an embodiment, the controller 1102 receives feedback that is used in adjusting the inputs provided to the throttle and steering. For example, if the AV 100 encounters a disturbance 1110, such as a hill, the measured speed 1112 of the AV 100 is lowered below the desired output speed. In an embodiment, any measured output 1114 is provided to the controller 1102 so that the necessary adjustments are performed, e.g., based on the differential 1113 between the measured speed and desired output. The measured output 1114 includes measured position 1116, measured velocity 1118, (including speed and heading), measured acceleration 1120, and other outputs measurable by sensors of the AV 100.

In an embodiment, information about the disturbance 1110 is detected in advance, e.g., by a sensor such as a camera or LiDAR sensor, and provided to a predictive feedback module 1122. The predictive feedback module 1122 then provides information to the controller 1102 that the controller 1102 can use to adjust accordingly. For example, if the sensors of the AV 100 detect ("see") a hill, this information can be used by the controller 1102 to prepare to engage the throttle at the appropriate time to avoid significant deceleration.

Figure 12:
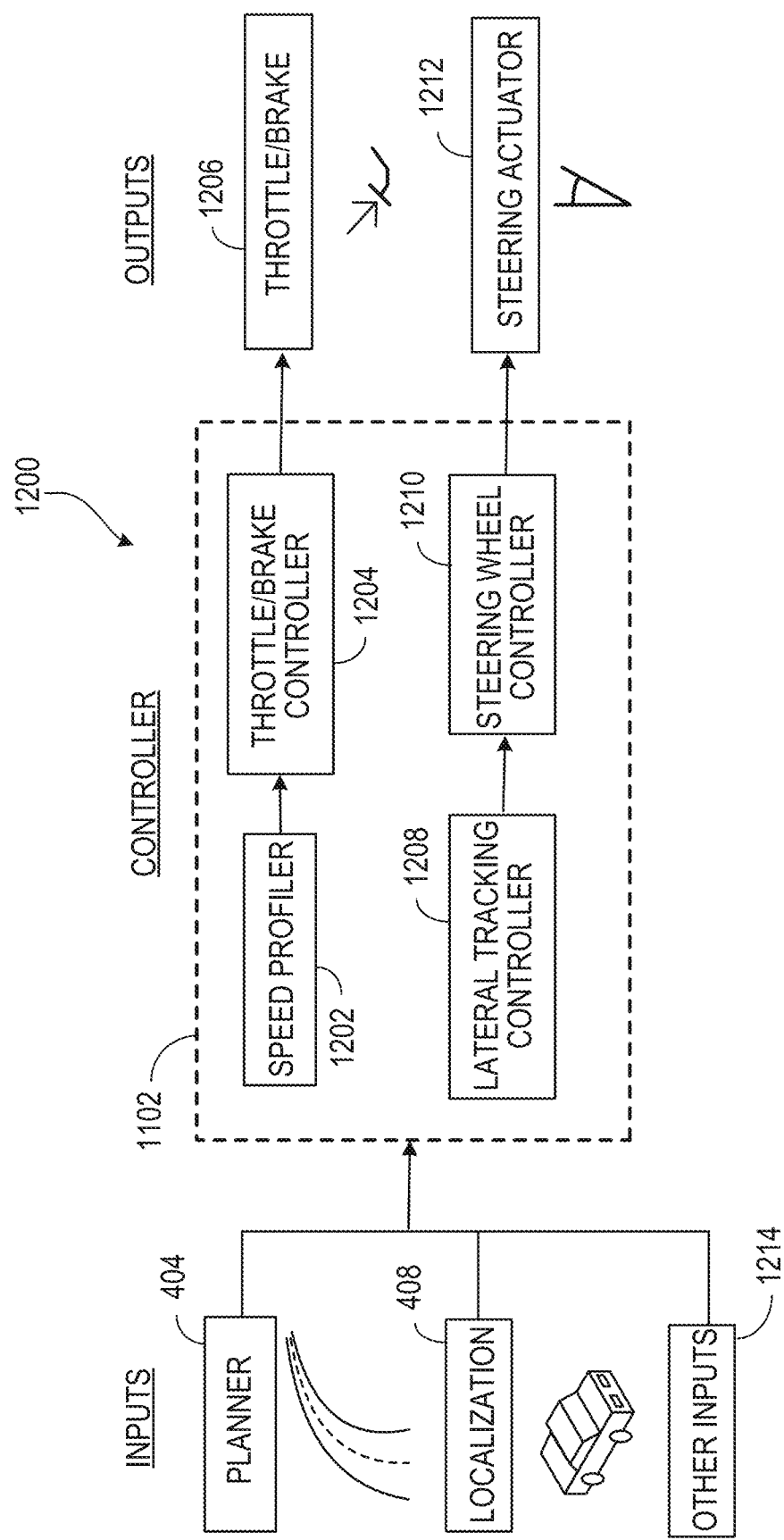
FIG. 12 shows a block diagram of the inputs, outputs, and components of a controller, in accordance with an embodiment.

FIG. 12 shows a block diagram 1200 of the inputs, outputs, and components of the controller 1102. The controller 1102 has a speed profiler 1202 which affects the operation of a throttle/brake controller 1204. For example, the speed profiler 1202 instructs the throttle/brake controller 1204 to engage acceleration or engage deceleration using the throttle/brake 1206 depending on, e.g., feedback received by the controller 1102 and processed by the speed profiler 1202.

The controller 1102 also has a lateral tracking controller 1208 which affects the operation of a steering controller 1210. For example, the lateral tracking controller 1208 instructs the steering controller 1210 to adjust the position of the steering angle actuator 1212 depending on, e.g., feedback received by the controller 1102 and processed by the lateral tracking controller 1208.

The controller 1102 receives several inputs used to determine how to control the throttle/brake 1206 and steering angle actuator 1212. A planning module 404 provides information used by the controller 1102, for example, to choose a heading when the AV 100 begins operation and to determine which road segment to traverse when the AV 100 reaches an intersection. A localization module 408 provides information to the controller 1102 describing the current location of the AV 100, for example, so that the controller 1102 can determine if the AV 100 is at a location expected based on the manner in which the throttle/brake 1206 and steering angle actuator 1212 are being controlled. In an embodiment, the controller 1102 receives information from other inputs 1214, e.g., information received from databases, computer networks, etc.

Steering Angle Calibration

Figure 13:
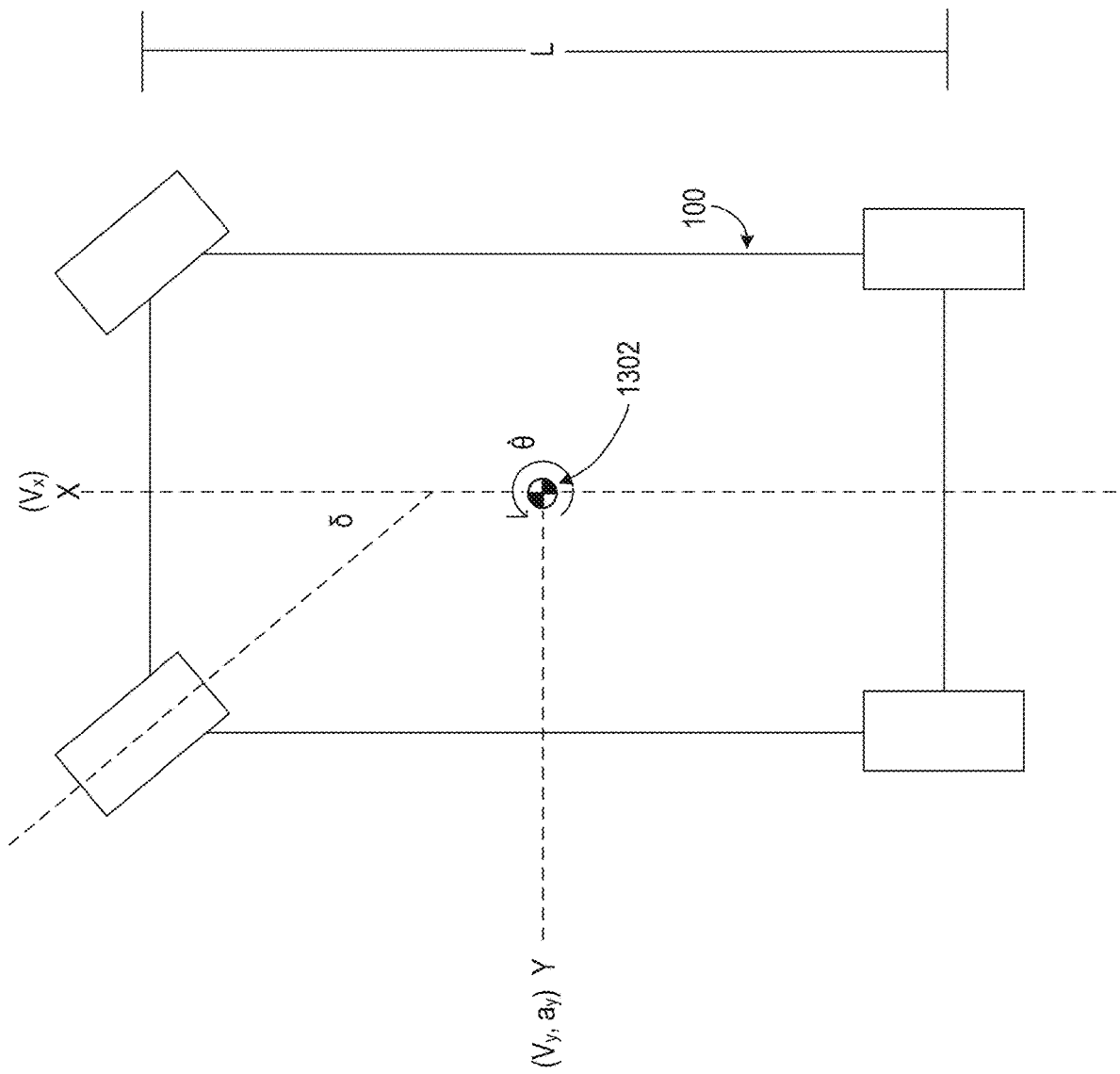
FIG. 13 is a top-down schematic diagram illustrating steering angle, yaw rate, and wheel base of an autonomous vehicle, in accordance with an embodiment.

FIG. 13 is a top-down schematic diagram illustrating steering angle, yaw rate, and wheel base of an autonomous vehicle, in accordance with an embodiment. An X-Y axis of the AV 100 is defined where velocity $V_x$ (forward speed) is the velocity along the X-axis, velocity $V_y$ is the velocity along the Y-axis, and $a_y$ is the lateral acceleration along the Y-axis.

The steering angle δ is the angle between the direction where a wheel of the AV 100 is pointing and the X-axis. In an embodiment, measuring steering angle offset requires measuring the steering angle δ and a slip angle β. The slip angle β is the angle between the direction where a wheel of the AV 100 is pointing and the direction in which the wheel is actually travelling. The slip angle β is given by equation [1]:

$$\beta = -\tan^{-1}\left(\frac{V_y}{V_x}\right) \quad [1]$$

Figure 14:
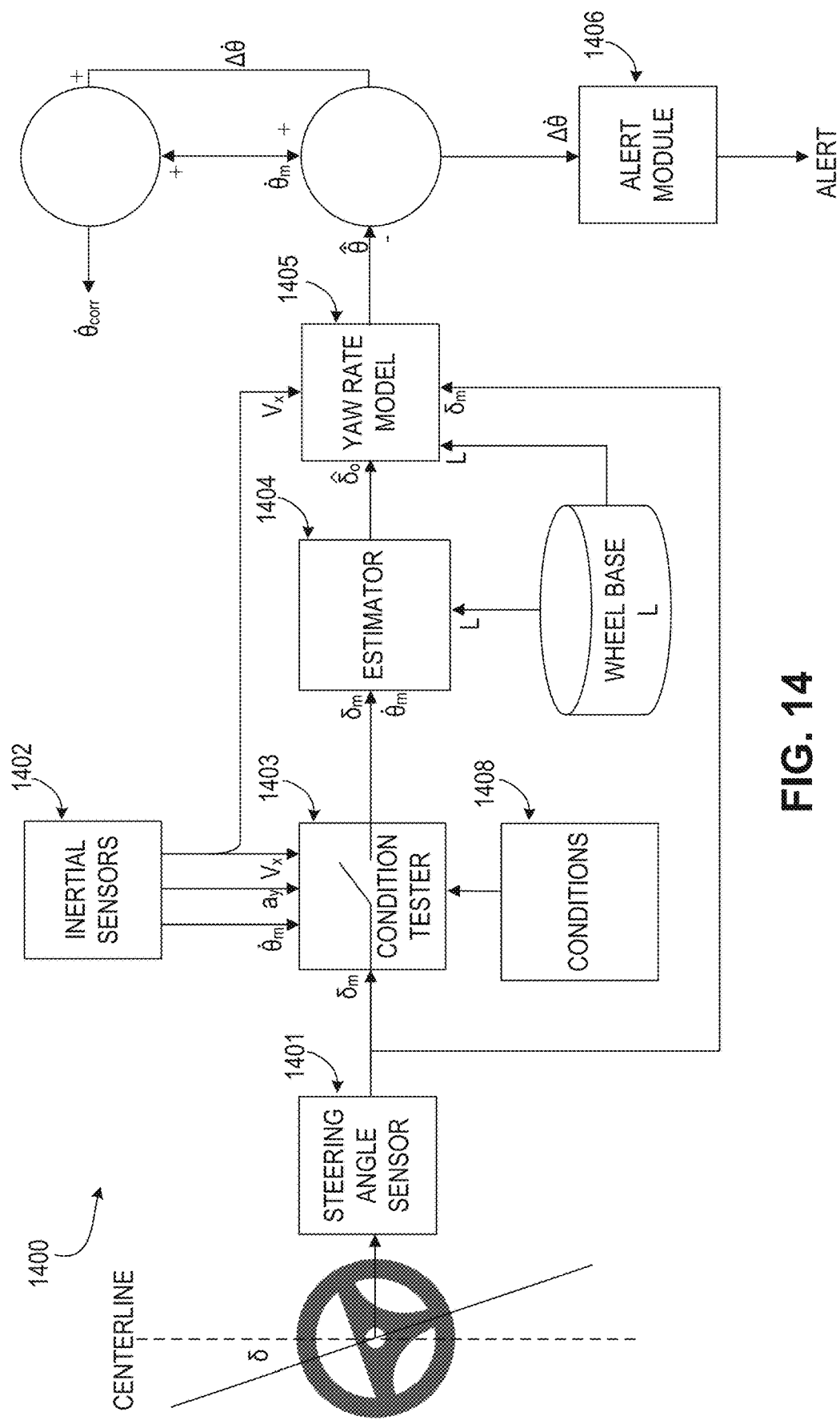
FIG. 14 is a block diagram of a system for estimating steering angle offset, in accordance with an embodiment.

In some embodiments, the slip angle β can be ignored by only taking measurements when certain conditions are present, such as measuring steering angle δ when the AV 100 is driving in a straight-line ($V_y$ is zero), as described in further detail in reference to FIG. 14.

The yaw rate measurement $\dot{\theta}_m$ is the rate of the AV's 100 rotation about the Z-axis which is perpendicular to the road (e.g., its angular velocity). In an embodiment, the Z-axis in the AV 100 is located at the center of gravity 1302 of the AV 100.

The wheel base L is the distance from the center of a front wheel to a center of a rear wheel and can be stored in memory of an electronic control unit (ECU) used for steering or other storage device on the AV 100.

FIG. 14 is a block diagram of a system 1400 for estimating steering angle offset, in accordance with an embodiment. System 1400 includes steering angle sensor (SAS) 1401, inertial sensors 1402, condition tester 1403, estimator 1404, and yaw rate model 1405.

In an embodiment, SAS 1401 outputs a steering angle measurement $\delta_m$. SAS 1401 can be a gyroscopic device, accelerometer, optical sensor, GPS sensor or other sensor 121 (e.g., optical or mechanical rotary encoder) that is part of the electronic power steering controls of the AV 100, including but not limited to: the steering wheel, the steering column, the steering shaft, and the wheels.

In an embodiment, the steering angle measurement $\delta_m$ is obtained by measuring a left-turn steering angle component $\delta_{left}$ during long left turns, measuring a right-turn steering angle component $\delta_{right}$ during long right turns, and taking the average of the components to obtain the steering angle measurement $\delta_m$:

$$\delta_m = \frac{\delta_{left} + \delta_{right}}{2} \quad [2]$$

In an embodiment, the left-turn steering angle component $\delta_{left}$ and the right-turn steering angle component $\delta_{right}$ are multiplied by weights $w_{left}$ and $w_{right}$, respectively, and summed to yield the steering angle measurement $\delta_m$ as shown in equation [3].

$$\delta_m = w_{left}\delta_{left} + w_{right}\delta_{right} \quad [3]$$

Equations [2] and [3] can be used when the steering angle measurement $\delta_m$ is likely to include measurement noise. Measurement noise can be caused by, for example, a steering wheel not being mounted correctly or poor road surface conditions as discussed in further detail below. An advantage to obtaining the steering angle measurement $\delta_m$ as shown in equations [2] and [3] is that later calculations involving steering angle measurement $\delta_m$ can disregard the effects of slip angle $\beta$. When measuring the steering angle, the contribution of the slip angle $\beta$ during left turns is effectively cancelled out by the contribution of the slip angle $\beta$ during right turns.

In an embodiment, inertial sensors 1402 output a yaw rate measurement $\dot{\theta}_m$, a lateral acceleration measurement $a_y$, and a forward speed measurement $V_x$. Some examples of inertial sensors 1402 include but are not limited to: gyroscopic devices and accelerometers. In an embodiment, the inertial sensors 1402 can be included in an inertial measurement unit (IMU). In other embodiments, a Global Navigation Satellite System (GNSS) (e.g., GPS) provides the speed and direction of the AV 100, which can be used in place of or in combination with inertial measurements.

Condition tester 1403 receives the measured steering angle $\delta_m$ from the steering angle sensor 1401, and the yaw angle measurement $\dot{\theta}_m$, the lateral acceleration measurement $a_y$, and the forward speed measurement $V_x$ from inertial sensors 1402. In an embodiment, condition tester 1403 tests for the presence of certain operating conditions 1408 before measurements are taken and/or are used by the estimator 1404.

For example, measurements can be taken or used when a first set of operating conditions 1408 are met, such as when the forward speed $V_x$ of the autonomous vehicle is below a threshold value (e.g., less than 5 m/s), the yaw rate measurement $\dot{\theta}_m$ is below a threshold value (e.g., less than abs (0.5 rad/s)) and a slip angle measurement is below a threshold value (e.g., less than 2 degrees). Measurements can also be taken or used when a second set of operating conditions 1408 are met, such as when the forward speed $V_x$ of the autonomous vehicle is below a threshold value (e.g., less than 5 m/s), the yaw rate measurement $\dot{\theta}_m$ is below a threshold value (e.g., less than abs (0.5 rad/s)) and the lateral acceleration measurement $a_y$ is below a threshold level (e.g., abs (1.0 m/s^2)). At low speeds there is less wheel slippage or skidding to distort the steering angle measurements and yaw rate measurements. Additionally, by taking or using measurements only when the operating conditions 1408 are met a simplified yaw rate model (e.g., first order model) and estimator/filter formulation can be used, as shown in equations [5]-[13] below.

In another embodiment, measurements are taken or used when a wheel base angle (e.g., camber angle) of the wheel of the AV is less than a threshold value (e.g., 2 degrees). Wheel base angle is the measure of the wheel's "lean" from top to bottom when viewed from the front or rear of wheel of the AV and can be directly measured or estimated from other observable parameters. The wheel of the AV has a positive wheel base angle when the top of the wheel leans away from the AV, and the wheel of the AV has a negative wheel base when top the wheel leans towards the AV. If the wheel base angle is not aligned, i.e., if the wheel base angle is not 0 degrees or less than a threshold value (e.g., 2 degrees), straight line stability of the AV is compromised. For example, if the wheel base angle is not set to be equal on either side of the AV, the vehicle will pull or drift to the left or the right. In another example, if the wheel base angle is not set to be 0 degrees or less than a threshold value (e.g., 2 degrees), the tires on the wheel will wear the tread on inside of the tire (negative wheel base) or wear the tread on the outside of the tire (positive wheel base) at an increased rate relative to the rest of the tire. An advantage of having the wheel base angle less than the threshold value is reducing the wear on the tire tread, as well as optimizing traction (e.g., by maximizing the amount of tire tread on the road to prevent wheel slippage or skidding). As a result of reduced wear on the tire tread and the optimized traction, measurements can be taken or used when there is less wheel slippage or skidding that distorts the steering angle measurements and yaw rate measurements.

To ensure that the sets of conditions 1408 described above are met, the processing circuit can use digital map data or other resources to identify opportunities for taking measurements that can meet the operating conditions 1408, such as identifying (e.g., using a planning module) stretches of roadway that are straight and have speed limits that ensure the lateral acceleration condition and forward speed conditions are met. For example, a trajectory output from the planning module of the AV 100 can be analyzed for measurement opportunities along a route. If the trajectory indicates a straight road segment or long curving road segment ahead of the AV 100, the system can schedule a measurement when the AV 100 reaches the road segment.

In an embodiment, the operating conditions 1408 are used to determine whether one or more wheels of the AV 100 is in static or kinetic contact with the road surface. For example, ice, rain, snow, oil, pot holes, gravel or other road surface conditions or anomalies could cause a loss of static contact between one or more tires of the AV 100 and the road surface (e.g., wheel slippage, skidding). The loss of static contact between the tires and the road surface can cause wheel slippage or skidding, resulting in erroneous measurements of steering angle and yaw rate. In an embodiment, the processing circuit can avoid taking or using measurements when certain road surface conditions are present that could result in erroneous measurements, or augment the steering angle measurements and/or yaw rate measurements to account for the road surface conditions.

For example, if a wireless weather forecast or sensor data from onboard or roadside sensors indicate that the road the AV 100 is travelling on is wet or icy, then the processing circuit assigns a weight to the steering angle measurement $\delta_m$ to account for the wet or icy road surface conditions, as shown in equation [3]. For example, a weight can be determined based on a coefficient of friction $\mu_x$ for the road surface determined by an onboard sensor or provided by another resource (e.g., a database). Measurements taken when weather conditions are optimal, for example, when the weather is sunny (e.g., warm and dry) are the weather conditions that lead to the most static contact between the wheels of the AV 100 and the road surface (e.g., because the rubber on the tires of the wheels can provide the most grip). Alternatively, when weather conditions are considered not optimal (e.g., during rain, snow, or extreme cold conditions), the rubber on the tires of the AV 100 cannot provide the most grip because surface will be more slippery.

In another embodiment, the operating conditions 1408 determine whether the passenger characteristics affect measurements. For example, if the passenger of the AV 100 has selected to manually operate the AV 100, and if the passenger drives erratically with many sharp and/or quick turns of the steering wheel, then the operating conditions 1408 will not transmit to the estimator 1404 (discussed in detail below) measurements obtained during the period of time the passenger was operating the AV 100. Quick, erratic driving following the passenger's characteristics result in less than optimal measurements, and are thus discarded.

In another embodiment, operating conditions 1408 determine whether the load or luggage characteristics (e.g., if the AV 100 is heavily laden) of the AV 100 affect measurements. For example, if the AV 100 is heavily laden, the normal force between the wheel and the road increases. The friction force increases proportionally to the normal force, as shown in equation [4]:

$$F = \mu N, \qquad [4]$$

where F is the friction force, $\mu$ is the coefficient of friction, and N is the normal force. As friction increases, the static contact between the wheel of the AV 100 and the road surface increases.

In an embodiment, operating conditions 1408 determine whether traffic conditions affect measurements. For example, the AV 100 can discard measurements obtained when there is no traffic as the AV 100 travels at higher speeds, while measurements obtained during periods of high traffic are obtained because high traffic optimizes measurements (e.g., because the AV 100 is travelling at lower speeds).

In an embodiment, operating conditions 1408 determine whether the spatiotemporal location of the AV 100 affect measurements. Factors to consider when taking the spatiotemporal location of the AV 100 into account include but are not limited to the location of the AV 100, the time of day, and traffic conditions. For example, a passenger of the AV 100 going to work in the morning uses a highway to get to work, and uses the same highway upon the passenger's return from work in the evening. In the morning, the traffic on the highway is minimal and the AV 100 is capable of driving at higher highway speeds, whereas traffic on the highway in the evening is heavy and the AV 100 is only capable of driving at lower speeds. In an embodiment, measurements obtained when the AV 100 is travelling at high speeds are discarded while the measurements obtained when the AV 100 is travelling at low speeds are used to estimate the steering angle offset, as the measurements are optimized at low speeds. In another example, an AV 100 travelling on a near-coastal road discards measurements when travelling on the near-coastal road during high tide, as the rising coastal water spray diminishes the static contact between the wheel of the AV 100 and the road.

In an embodiment, operating conditions 1408 are used to determine whether the passenger's preferences affect measurements. For example, a passenger going from point A to point B may be presented with a paved road route option and a dirt road shortcut route option. If the passenger's preference is to use the shortcut route (where the dirt road leads to diminished static contact due to a lower coefficient of friction $\mu$), then measurements obtained are discarded. Alternatively, if the passenger's preference is to travel on the paved road route (where static contact is optimized between the wheel and the paved road due to the higher coefficient of friction $\mu$), then measurements obtained will be used in estimating steering angle offset.

The system 1400 can take into account any one or more of the above conditions, alone or in combination, when estimating steering angle offset.

Since tire wear can impact steering angle offset, in an embodiment, one or more sensors on the AV 100 can provide sensor data that indicates (or can be used to estimate) tire wear. The estimated tire wear is then used to generate a weight to augment the steering angle measurement $\delta_m$ and/or yaw rate measurement $\dot{\theta}_m$.

If the operating conditions 1408 are met, estimator 1404 receives the measured steering angle $\delta_m$, the yaw rate measurement $\dot{\theta}_m$ and the known wheel base L (e.g., from a storage device 134 on the AV 100) and provides an estimate of the unobservable steering angle offset $\hat{\delta}_o$.

In an embodiment, the estimated steering angle offset $\hat{\delta}_o$ is determined using one of a Kalman filter formulation, least squares (LS) adaptive filter formulation, recursive least squares (RLS) adaptive filter formulation, linear regression formulation, nonlinear regression formulation, Bayes' filter formulation or any other suitable filter or estimator. For example, estimator 1404 can use a RLS adaptive filter to estimate the unobservable steering angle offset $\hat{\delta}_o$, as shown in equations [5]-[17].

To formulate an RLS adaptive filter, the theoretical yaw rate $\dot{\theta}$ is modeled as a function of the forward speed $V_x$, the measured steering angle $\delta_m$ and the unobservable steering angle offset $\delta_o$ according as shown in equation [5]:

$$\dot{\theta} = \frac{V_x}{L} \tan(\delta_m + \delta_o) \qquad [5]$$

To simplify the formulation, the yaw rate model is linearized using a Taylor series expansion shown in equation [6]:

$$\dot{\theta} = \frac{V_x}{L} [\tan(\delta_m) + \delta_o \tan'(\delta_o) + \ldots], \qquad [6]$$

where the terms in the brackets beyond the first order of the expansion in equation [6] are omitted as shown in equation [7]:

$$\dot{\theta} = \frac{V_x}{L} [\tan(\delta_m) + \delta_o \tan'(\delta_m)]. \qquad [7]$$

To formulate the RLS adaptive filter, the terms in equation [7] are rearranged according to equations [8]-[11]:

$$\dot{\theta} - \frac{V_x}{L}\tan(\delta_m) = \delta_o \frac{V_x}{L}\tan'(\delta_m), \qquad [8]$$

$$\frac{\dot{\theta} - \frac{V_x}{L}\tan(\delta_m)}{\frac{V_x}{L}} = \delta_o \tan'(\delta_m), \qquad [9]$$

$$\frac{L}{V_x}\dot{\theta} - \tan(\delta_m) = \delta_o \tan'(\delta_m), \qquad [10]$$

$$Y = \delta_o X, \qquad [11]$$

where X and Y in equation [11] are placeholder variables used in the RLS adaptive filter formulation, where the prediction step is given by equation [12], $$\hat{\delta}_0(n) = \hat{\delta}_0(n-1)X + K\varepsilon(n), \qquad [12]$$

and the prediction error $\varepsilon(n)$ is given by:

$$\varepsilon(n) = Y - \hat{\delta}_0(n-1)X. \qquad [13]$$

The gain K is calculated using the measured steering angle $\delta_m$ and yaw rate measurement $\dot{\theta}_m$ as observations as:

$$K = \frac{P(n-1)X}{\lambda + X^T P(n-1)X}, \qquad [14]$$

$$K = P(n-1)X(\lambda + X^T P(n-1)X)^{-1}. \qquad [15]$$

The covariance P(n) is given by:

$$P(n) = \frac{(I - KX)P(n-1)}{\lambda}, \qquad [16]$$

where I is the identity matrix and $\Delta$ is a forgetting factor used to reduce the influence of past measured steering angles $\delta_m$ and yaw rate measurements $\dot{\theta}_m$. As the forgetting factor $\lambda$ decreases, the contribution of previous samples decreases.

In an embodiment, the forgetting factor A is set to filter or discard past steering angle measurements $\delta_m$ and yaw rate measurements $\dot{\theta}_m$ after a specified time period or driving distance, for example, after every week or after every 100 miles. In another embodiment, the estimated steering angle offsets $\hat{\delta}_0$ output by the estimator 1404 is averaged (e.g., using a moving average) to remove spurious estimates.

In an alternative embodiment, a Kalman filter formulation can be used estimate the steering angle offset $\hat{\delta}_0$. The equations of the Kalman filter formulation are well-known and will not be discussed further. An example process model for the Kalman filter is given by:

$$\dot{\delta} = 0, \qquad [17]$$

$$\Delta\dot{\delta} = 0. \qquad [18]$$

An example measurement model is given by:

$$\dot{\theta} = \frac{V_x}{L}\delta \text{ (yaw rate measurement)}, \qquad [19]$$

$$\delta_m = \delta + \Delta\delta \text{ (steering angle measurement)}. \qquad [20]$$

The Kalman filter gains can be tuned empirically by selecting an appropriate process noise and measurement noise using techniques well-known in the art. The Kalman filter can also be reset as necessary to ensure its proper operation.

In an embodiment, the estimated steering angle offset $\hat{\delta}_O$ is used to determine whether a software calibration of the steering alignment is performed or if a mechanical calibration of the steering alignment is necessary. Yaw rate model 1405 estimates the estimated yaw rate $\hat{\dot{\theta}}$ using the estimated steering angle offset $\hat{\delta}_0$, the measured steering angle $\delta_m$ the forward speed $V_x$, and the wheel base L:

$$\hat{\dot{\theta}} = \frac{V_x}{L}\tan(\delta_m + \hat{\delta}_o). \qquad [21]$$

A delta yaw rate $\Delta\dot{\theta}$ can then be computed as the difference between the yaw rate measurement $\dot{\theta}_m$ and the estimated yaw rate $\hat{\dot{\theta}}$:

$$\Delta\dot{\theta} = \dot{\theta}_m - \hat{\dot{\theta}}. \qquad [22]$$

In an embodiment, if the delta yaw rate $\Delta\dot{\theta}$ is below a specified threshold where software calibration is able to correct the yaw rate measurement $\dot{\theta}_m$, the processing circuit will calibrate the yaw rate measurement $\dot{\theta}_m$ with the delta yaw rate $\Delta\dot{\theta}$ (a calibration parameter) to obtain a calibrated yaw rate measurement $\dot{\theta}_{corr}$ that can be used by a control circuit of the AV 100 to control the AV 100:

$$\dot{\theta}_{corr} = \dot{\theta}_m + \Delta\dot{\theta}, \text{ for } \Delta\dot{\theta} < T. \qquad [23]$$

In an embodiment, the threshold T can be determined empirically and can differ from AV to AV. If the delta yaw rate $\Delta\dot{\theta}$ is above the specified threshold T, such that software calibration is unable to correct the yaw rate measurement $\dot{\theta}_m$, the processing circuit will trigger an alert condition.

When an alert condition is triggered, the processing circuit of the AV 100 alerts a passenger in the AV 100 or other entities (e.g., auto repair shop) using one or more of audio, visual, or infographic alerts through one or more output devices of the AV 100, including but not limited to: speakers, displays 312, a center console, touch screens, navigation screens, and heads-up display. In an embodiment, the AV 100 sends the alert to a passenger's personal device, such as a smartphone, wearable computer or tablet computer. Alerts include but are not limited to maintenance alerts, safe driving alerts and maneuver alerts (e.g., alerting the passenger the AV 100 is going to perform a safe stop maneuver). In an embodiment, the navigation system can be configured to display a route to the nearest auto repair shop that can perform a mechanical steering alignment.

In an embodiment, a maximum speed of the AV 100 can be enforced by the controller circuit of the AV 100 based on the size of $\hat{\delta}_0$ or $\Delta\dot{\theta}$. For example, if $\hat{\delta}_0$ or $\Delta\dot{\theta}$ exceeds a specified threshold that would make the AV 100 unsafe to operate, the control circuit will not allow the AV 100 to be operated beyond a specified maximum speed to ensure safe operation of the AV 100. In an embodiment, the AV 100 may be operated to perform a safe maneuver or "limp" mode of operation with the maximum speed constraint enforced.

In an embodiment, the steering angle offset $\hat{\delta}_0$ is predicted using machine learning techniques. For example, previously recorded steering angle measurements $\delta_m$ and previously recorded yaw rate measurements $\dot{\theta}_m$ are used to train a neural network (e.g., convolutional or feed forward neural network) that is used to predict the estimated steering angle offset $\hat{\delta}_0$.

In an embodiment, road and weather conditions (e.g., whether the road is slick due to rain or oil) and/or load characteristics of the AV 100 (e.g., carrying heavy cargo) are used with steering angle and yaw rate measurements to predict the steering angle offset. For example, because a heavily laden AV 100 may lean more during a turn the neural network models the load characteristics that affect the steering angle offset.

In an embodiment, machine learning techniques are used to detect anomalies in the measurements. For example, a steering angle measurement obtained from the steering angle sensors 1401 and/or inertial sensors 1402 can be discarded if it is an outlier compared to measurements obtained under the same conditions (e.g., obtained at or near the same time). For example, an AV 100 travelling on a straight road obtains a steering angle measurement $\delta_m$ and a yaw rate measurement $\dot{\theta}_m$ that are fairly consistent, but then a measurement "spike" is obtained where values of the steering angle measurement $\delta_m$ and the yaw rate measurement $\dot{\theta}_m$ jump. This could be due to a pothole in the road. The outlier measurements are discarded to avoid skewing the estimation of steering angle offset. The measurements that are not discarded are used to determine a variable steering angle offset $\hat{\delta}_0$ that is continuously updated and adjusted using the plurality of steering angle offsets $\hat{\delta}_0$ estimated over the period of time or driving distance.

In addition to predicting steering angle offset, machine learning (e.g., neural networks, decision trees) can be used to predict a driving scenario and then change a driving mode (e.g., sport, comfort) of the AV. Supplemental data such as weather conditions, passenger preferences, passenger characteristics, load or luggage characteristics, spatiotemporal location, traffic, time of day and road conditions can be used to predict the driving scenario for the AV. For example, the supplemental data can be modeled in a decision tree. In response to the decision tree output predicting a driving scenario, various vehicle systems are transitioned into an appropriate driving mode for the AV. For example, the decision tree (or neural network) output can cause the AV to automatically transition to a "sport" driving mode with more steering resistance for a "tighter" feel, a more responsive accelerator for faster acceleration and more rigid suspension for improved performance at higher speeds than in a "normal" driving mode.

Figure 15:
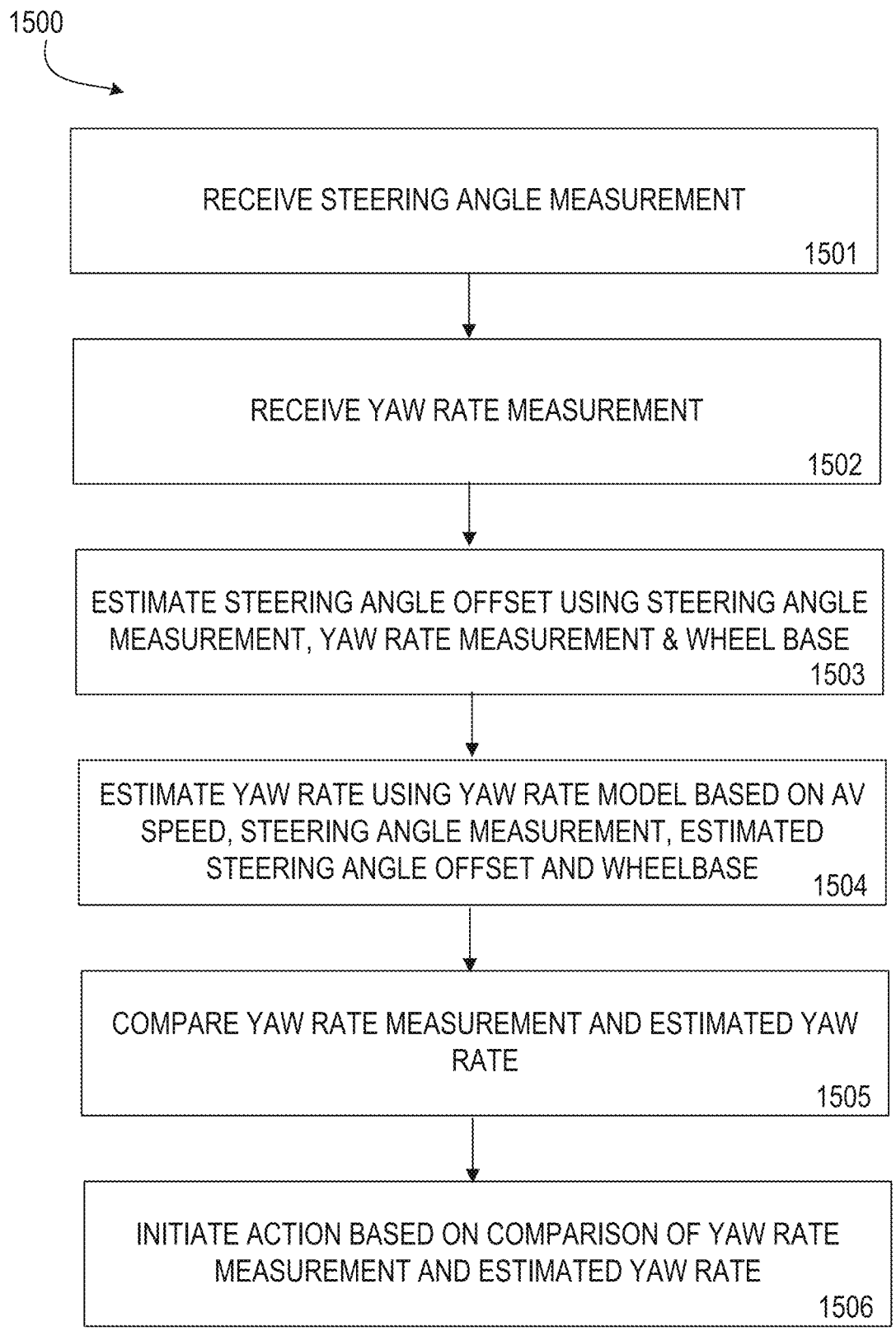
FIG. 15 shows a flow diagram of estimating steering angle offset, in accordance with an embodiment.

FIG. 15 shows a flow diagram of a process 1500 for estimating steering angle offset. The process 1500 can be implemented by processing circuit, such as the computer system described in reference to FIG. 3.

Process 1500 can begin by receiving one or more steering angle measurements (1501). For example, the steering angle measurements can be received from a sensor, such as an optical rotary sensor included in the steering system of the AV. In an embodiment, the steering angle measurement is augmented to account for non-static contact road surface conditions and to cancel out slip angle or other left-turn or right-turn biases. In an embodiment, a plurality of steering angle measurements are determined over a specified period of time or distance and filtered to remove outlier measurements (e.g., averaged).

Process 1500 continues by receiving one or more yaw rate measurements (1502). For example, one or more yaw rate measurements can be received from a yaw rate sensor (e.g., gyroscopic device) which may or may not be included in an IMU. In an embodiment, a plurality of yaw rate measurements are captured over a specified period of time or distance and filtered to remove outlier measurements (e.g., averaged).

Process 1500 continues by estimating a steering angle offset (1503) based on the measured steering angle, yaw rate measurement and a wheel base of the AV. For example, an adaptive filter or estimator can be used to estimate the steering angle offset, as described in reference to FIG. 14.

Process 1500 continues by determining an estimated yaw rate (1504) based on a yaw rate model 1405, the steering angle measurement, and the estimated steering angle offset. For example, a yaw rate model that is a function of the measured steering angle and the estimated steering angle offset can be used to determine the estimated yaw rate, such as the first order yaw rate model shown in equation [6].

Process 1500 continues by computing a yaw rate difference (delta yaw rate) by comparing the yaw rate measurement and the estimated yaw rate (1505). For example, a delta yaw rate can be computed as the difference between the measured yaw rate and estimated yaw rate and compared to a threshold value to determine if software calibration can be performed or if mechanical steering alignment is necessary. If software calibration is possible, the delta yaw rate is used to calibrate the measured yaw rate, and thus improve the accuracy of the control commands which rely on an accurate measured yaw rate to control the steering of the AV.

Process 1500 continues by initiating an action on the AV based on the result of comparing (1506). For example, the AV can generate a maintenance or other alert that can be displayed to a passenger on an output device of the AV and/or on a personal device of the passenger (e.g., a smartphone, wearable computer). Initiating an action can include automatically contacting an auto repair shop to set up a steering alignment service for the AV. In an embodiment, the planning module of the AV can compute a trajectory to the closest auto repair shop, and then operate the AV to drive to the auto repair shop. In an embodiment, process 1500 determines if a delta yaw rate and the estimated steering angle offset exceed a threshold value to determine if a software calibration of the steering angle measurement can be performed. If software calibration is possible, the AV can apply the calibration when safe to do so, such as when the AV is idle or parked for specified period of time (e.g., parked in a garage overnight). In an embodiment, if the delta yaw rate is above the threshold, the AV is operated to perform a safe stop maneuver or drive immediately to an auto repair shop if safe to do so as determined by the AV's planning module.

In an embodiment, initiating an action on the AV includes sending, using a wireless transmitter of the AV, at least one of steering angle measurements or yaw rate measurements to a network-based computing platform, receiving, using a wireless transmitter of the AV, the maintenance alert from the network-based computing platform, and presenting, using an output device of the autonomous vehicle, the maintenance alert. In this embodiment, more accurate algorithms (e.g., forward/backward Kalman filtering) and higher order models (higher order yaw rate models) can be used to estimate the steering angle offset due to the increased computing power available on the network-based computing platform.

In the foregoing description, embodiments of various implementations have been described with reference to numerous specific details that may vary from implementation to implementation. The description and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction. Any definitions expressly set forth herein for terms contained in such claims shall govern the meaning of such terms as used in the claims. In addition, when we use the term "further comprising," in the foregoing description or following claims, what follows this phrase can be an additional step or entity, or a sub-step/sub-entity of a previously-recited step or entity.

What is claimed is:

1. A method comprising:
receiving, using a processing circuit of an autonomous vehicle (AV), a steering angle measurement;
receiving, using the processing circuit, a yaw rate measurement, wherein the steering angle measurement and the yaw rate measurement are taken when a set of operating conditions is met, wherein the set of operating conditions includes a forward speed of the AV less than a threshold value and presence of one or more road surface conditions;
estimating, using the processing circuit, a steering angle offset based on the steering angle measurement, the yaw rate measurement, and a wheel base of the AV;
determining, using the processing circuit, an estimated yaw rate equal to $$\frac{V_x}{L}\tan(\delta_m + \hat{\delta}_o)$$

where $V_x$ is a forward speed of the AV, L is the wheel base of the AV, $\delta_m$ is the measured steering angle, and $\hat{\delta}_o$ is the estimated steering angle offset; and
operating, using a control circuit, the AV based on the estimated yaw rate.

2. The method of claim 1, further comprising:
comparing, using the processing circuit, the yaw rate measurement, and the estimated yaw rate; and
wherein operating the AV based on the estimated yaw rate comprises initiating, using the processing circuit, an action on the AV based on a result of the comparing.

3. The method of claim 2, wherein the action comprises:
calibrating, by the processing circuit, the yaw rate measurement using the estimated yaw rate.

4. The method of claim 1, wherein receiving the steering angle offset comprises:
receiving, using the processing circuit, a left-turn component of the steering angle measurement when the AV is making a left turn;
receiving, using the processing circuit, a right-turn component of the steering angle measurement when the AV is making a right turn; and
determining, using the processing circuit, the steering angle measurement based on the left-turn component and the right-turn component.

5. The method of claim 4, wherein the determined steering angle measurement is an average of the left-turn component and the right-turn component.

6. The method of claim 1, wherein the estimated steering angle offset is determined using a recursive least squares estimator formulation that includes the steering angle measurement, the yaw rate measurement, and the wheel base of the AV.

7. The method of claim 1, wherein the estimated steering angle offset is determined using a Kalman filter formulation that includes the steering angle measurement, the yaw rate measurement, and the wheel base of the AV.

8. The method of claim 1, wherein the set of operating conditions further includes the yaw rate measurement less than 0.5 rad/s.

9. The method of claim 1, further comprising:
determining, using data from one or more sensors of the AV, whether a wheel of the AV is in static contact with a road surface; and
in accordance with a determination that the wheel of the AV is not in static contact with the road surface, excluding, using the processing circuit, the steering angle measurement from the steering angle offset estimating or augmenting the steering angle measurement.

10. The method of claim 1, further comprising:
estimating a plurality of steering angle offsets over a period of time or a driving distance; and
filtering the plurality of steering angle offsets to remove outlier estimated steering angle offsets.

11. The method of claim 1, further comprising:
estimating a plurality of steering angle offsets over a period of time or a driving distance; and
determining a variable steering angle offset based that is continuously adjusted based on the plurality of steering angle offsets.

12. The method of claim 1, wherein operating the AV based on the estimated yaw rate comprises:
presenting an alert to an output device of the AV or a personal device of a passenger of the AV.

13. The method of claim 1, wherein operating the AV based on the estimated yaw rate comprises:
sending, using a wireless transmitter of the AV, at least one of steering angle measurements or yaw rate measurements to a network-based computing platform;
receiving, using a wireless receiver of the AV, a maintenance alert from the network-based computing platform; and
presenting, using an output device of the AV, the maintenance alert.

14. The method of claim 1, wherein operating the AV based on the estimated yaw rate comprises:
sending, using a wireless transmitter of the AV, the one or more road surface conditions to a network-based computing platform; and
receiving, using a wireless receiver of the AV, a steering angle calibration parameter from the network-based computing platform, the steering angle calibration parameter determined by the network-based computing platform based on the one or more road surface conditions; and
augmenting, by the processing circuit, the steering angle measurement with the steering angle calibration parameter.

15. The method of claim 1, further comprising:
operating, using the control circuit, an AV according to a maximum speed limit, wherein the maximum speed limit is determined based at least in part on the steering angle offset.

16. The method of claim 15, wherein the maximum speed limit is determined based on the steering angle offset and weather conditions of the environment.

17. The method of claim 1, further comprising:
recording supplemental data, wherein the supplemental data comprises weather conditions, passenger characteristics, passenger preferences, load or luggage characteristics, spatiotemporal location, traffic, time of day, and road conditions; and
determining the set of operating conditions based on the supplemental data.

18. The method of claim 1, further comprising:
  training a neural network with previously recorded offset data; and
  predicting, using the neural network, the estimated steering angle offset.

19. The method of claim 18, further comprising:
  training the neural network with previously recorded supplemental data.

20. The method of claim 1, wherein the steering angle measurement or the yaw rate measurement is based on processing, by the processing circuit, the steering angle measurement based on a road condition.

21. The method of claim 1, wherein the steering angle measurement or the yaw rate measurement is based on identification, by the processing circuit, of a wheel base angle.

22. The method of claim 1, wherein the forward speed of the AV is less than 5 m/s.

23. The method of claim 1, wherein the one or more road surface conditions include a wet road surface, an icy road surface, or an oily road surface.

24. A steering angle calibration system for an autonomous vehicle (AV), the system comprising:
  a steering angle sensor;
  a yaw rate sensor;
  one or more processing circuits;
  one or more non-transitory storage media storing instructions which, when executed by the one or more processing circuits, cause performance of operations comprising:
    receiving a steering angle measurement from the steering angle sensor;
    receiving a yaw rate measurement from the yaw rate sensor, wherein the steering angle measurement and the yaw rate measurement are taken when a wheel base angle of a wheel of the AV is less than a wheel base angle threshold value;
    estimating a steering angle offset based on the steering angle measurement, the yaw rate measurement and a wheel base of the AV;
    determining an estimated yaw rate, the estimated yaw rate equal to $$\frac{V_x}{L}\tan\left(\delta_m + \hat{\delta}_o\right)$$

where $V_x$ is a forward speed of the AV, L is the wheel base of the AV, $\delta_m$ is a measured steering angle based on the steering angle measurement, and $\hat{\delta}_o$ is the estimated steering angle offset;
    comparing the yaw rate measurement and the estimated yaw rate; and
    initiating an action on the AV based on a result of the comparing.

25. The system of claim 24, wherein the steering angle sensor is a steering column sensor.

26. The system of claim 24, wherein the steering angle sensor is a steering wheel sensor.

27. A non-transitory, computer-readable storage medium having instructions stored thereon, that when executed by one or more processors of an autonomous vehicle (AV), cause the one or more processors to perform operations comprising:
  receiving a steering angle measurement;
  receiving a yaw rate measurement, wherein the steering angle measurement and the yaw rate measurement are taken when a wheel base angle of a wheel of the AV is less than a wheel base angle threshold value;
  estimating a steering angle offset based on the steering angle measurement, the yaw rate measurement, and a wheel base of the AV;
  determining an estimated yaw rate equal to $$\frac{V_x}{L}\tan\left(\delta_m + \hat{\delta}_o\right)$$

where $V_x$ is a forward speed of the AV, L is the wheel base of the AV, $\delta_m$ is a measured steering angle based on the steering angle measurement, and $\hat{\delta}_o$ is the estimated steering angle offset; and
  operating the AV based on the estimated yaw rate.

* * * * *